US005790031A

United States Patent [19]
Shelton et al.

[11] Patent Number: 5,790,031
[45] Date of Patent: Aug. 4, 1998

[54] APPARATUS AND METHOD FOR SENSING A REARWARD FACING CHILD SEAT WITH ERROR DETECTION

[75] Inventors: Dennis James Shelton, Southfield; Thomas John LeMense, Livonia, both of Mich.

[73] Assignee: TRW Inc., Lyndhurst, Ohio

[21] Appl. No.: 782,773

[22] Filed: Jan. 13, 1997

[51] Int. Cl.$^6$ ...................................................... G08B 13/14
[52] U.S. Cl. .................. 340/572; 340/573; 340/825.54; 297/216.11; 280/735; 180/273
[58] Field of Search ...................................... 340/551, 552, 340/572, 686, 436, 573, 825.54; 297/216.11, 250.1; 280/730.1, 735; 180/273

[56] References Cited

U.S. PATENT DOCUMENTS

| | | | |
|---|---|---|---|
| 3,720,940 | 3/1973 | Fox et al. | 340/572 |
| 3,868,669 | 2/1975 | Minasy | 340/572 |
| 4,168,496 | 9/1979 | Lichtblau | 340/572 |
| 5,036,308 | 7/1991 | Fockens | 340/572 |
| 5,189,397 | 2/1993 | Watkins et al. | 340/572 |
| 5,218,343 | 6/1993 | Stobbe et al. | 340/572 |
| 5,347,263 | 9/1994 | Carroll et al. | 340/572 |
| 5,349,339 | 9/1994 | Kind | 340/572 |
| 5,494,311 | 2/1996 | Blackburn et al. | 280/735 |
| 5,515,933 | 5/1996 | Meyer et al. | 180/273 |
| 5,605,348 | 2/1997 | Blackburn et al. | 180/273 |
| 5,618,056 | 4/1997 | Schoos et al. | 340/572 |

OTHER PUBLICATIONS

U.S. Patent Application Serial No. 08/147,682 to Blackburn, et al. filed Nov. 3, 1993 for Method and Apapratus Fors Sensing a Rearward Facing Child Seat, Status: Allowed (copy not enclosed).

U.S. Patent Application Serial No. 08/719,267 to LeMense filed Sep. 24, 1996 for Apparatus and Method for Sensing a Rearward Facing Child Seat (copy not enclosed).
U.S. Patent Application Serial No. 08/730,674 to LeMense filed Oct. 11, 1996 for Apparatus and Method for Sensing a Rearward Facing Child Seat Using Beat Frequency Detection (copy not enclosed).

*Primary Examiner*—Jeffery A. Hofsass
*Assistant Examiner*—Daniel J. Wu
*Attorney, Agent, or Firm*—Tarolli, Sundheim, Covell, Tummino & Szabo

[57] ABSTRACT

An apparatus (52) senses the presence of a rearward facing child restraint seat (34) in a vehicle. Signal generating components (80, 84 and 90) of a driver/receiver circuit (64) provide an electrical transmit signal, at a first frequency, which is applied to an antenna (60) and the antenna transmits an electromagnetic (EM) signal (62) at the first frequency during a first time period. During a second time period, a component (84) of the driver/receiver circuit (64) provides a signal at a second, different frequency. An identification tag (54) is securable to the child restraint seat (34) and provides an EM return signal (68) in response to the EM transmit signal (62). The antenna (60) receives the EM return signal (68) and provides an electrical return signal in response to the EM return signal. A mixer (122) is coupled to receive both the second frequency signal and the electrical return signal in the second time period, and provides a beat frequency signal. The presence and duration of the beat frequency signal may be indicative of the presence of the identification tag (54). An output signal from the driver/receiver circuit (64) is a function of the beat frequency signal and contains information. A processor (70) processes the information in the output signal and determines: (i) presence of the identification tag (54) and (ii) whether the information is unreliable thus affecting the determination of presence of the identification tag.

26 Claims, 13 Drawing Sheets

TAG ABSENT

TAG PRESENT

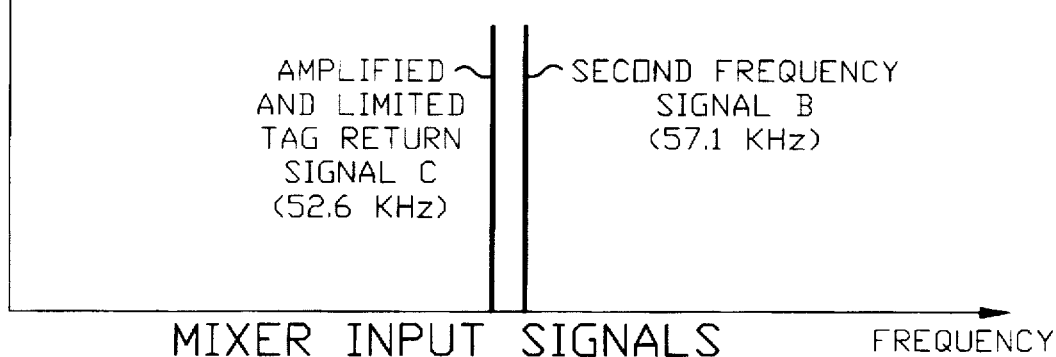
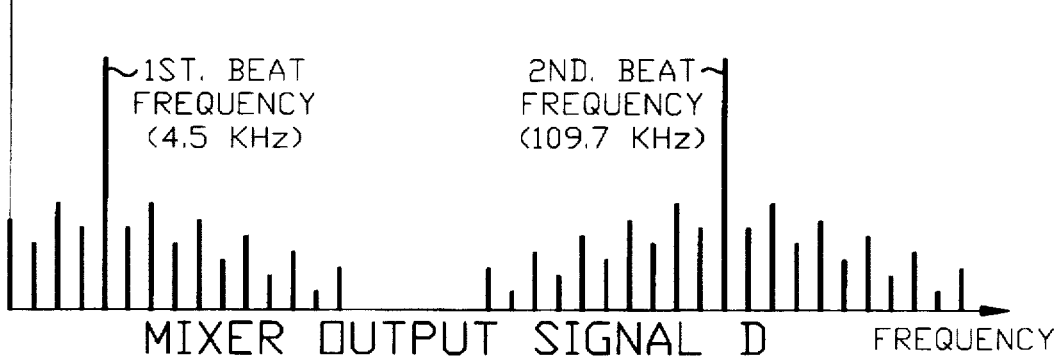
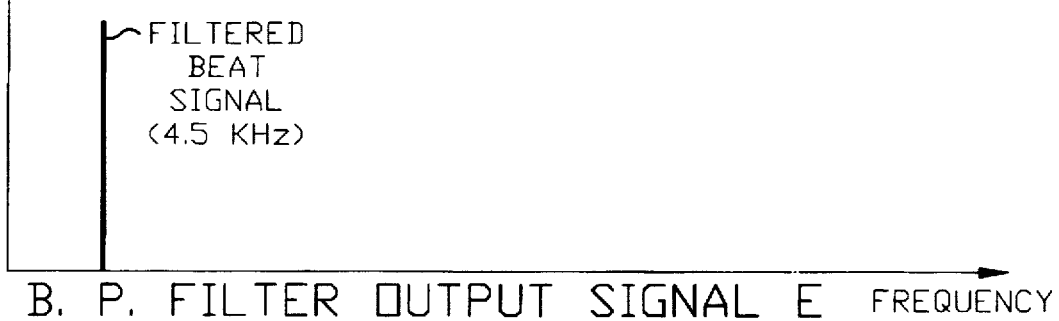

INTERFERENCE PRESENT

ANTENNA DAMAGED

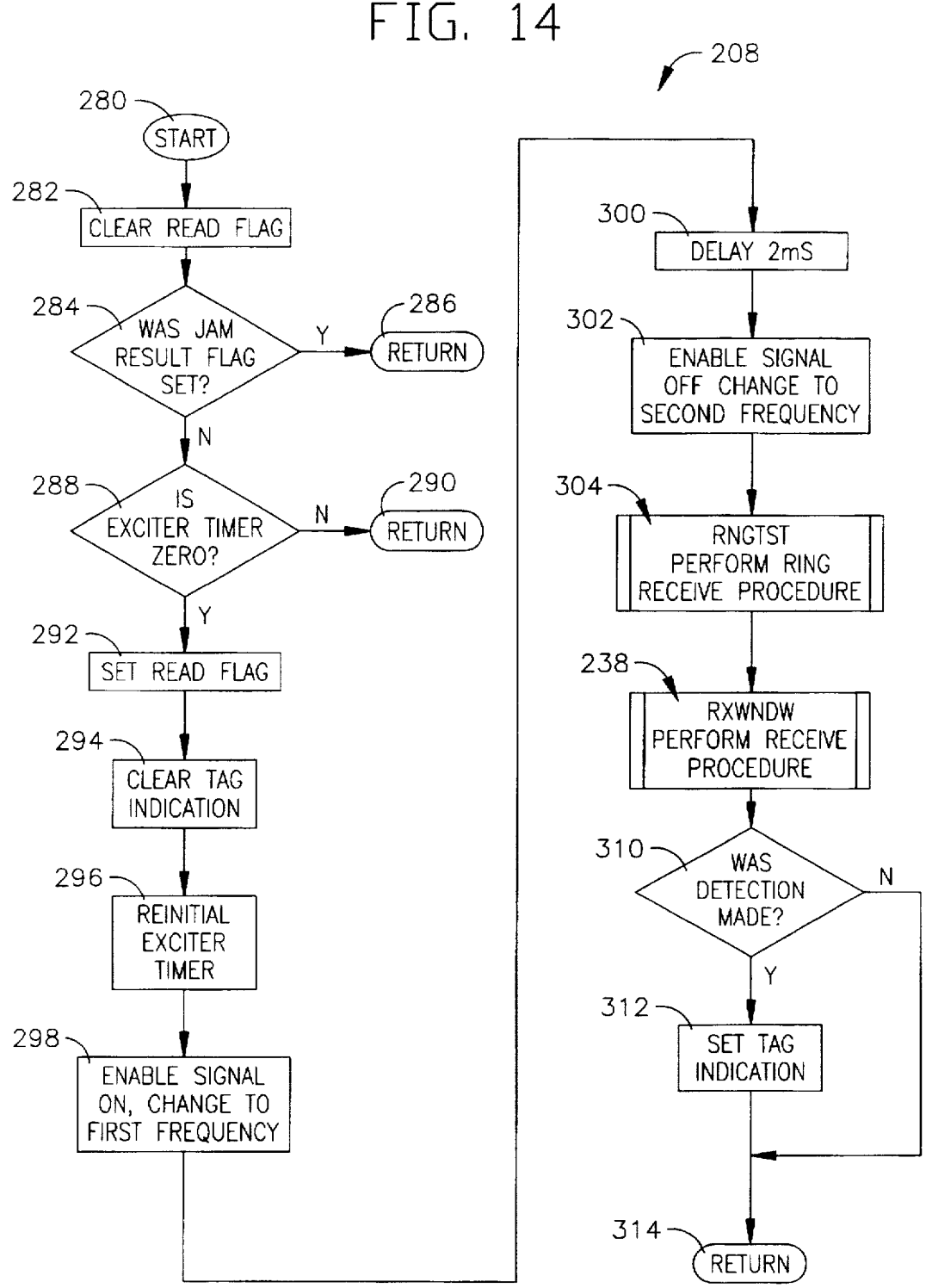

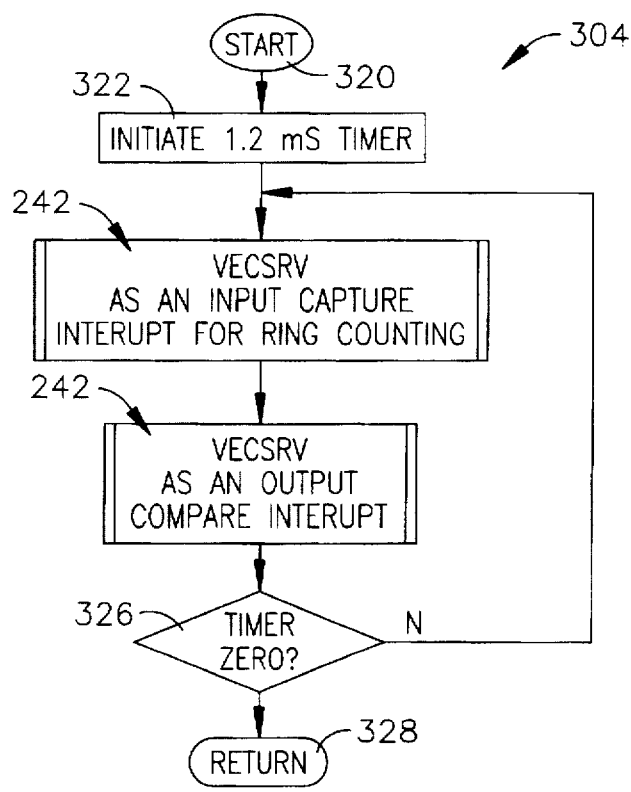
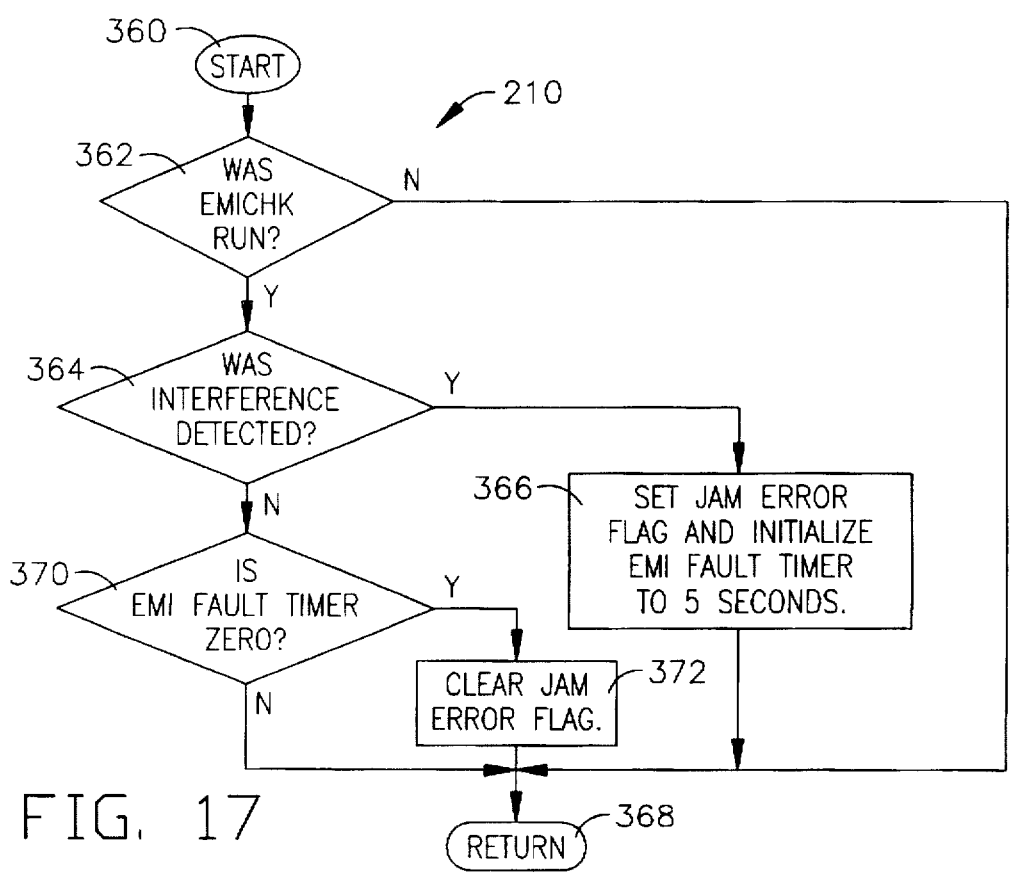

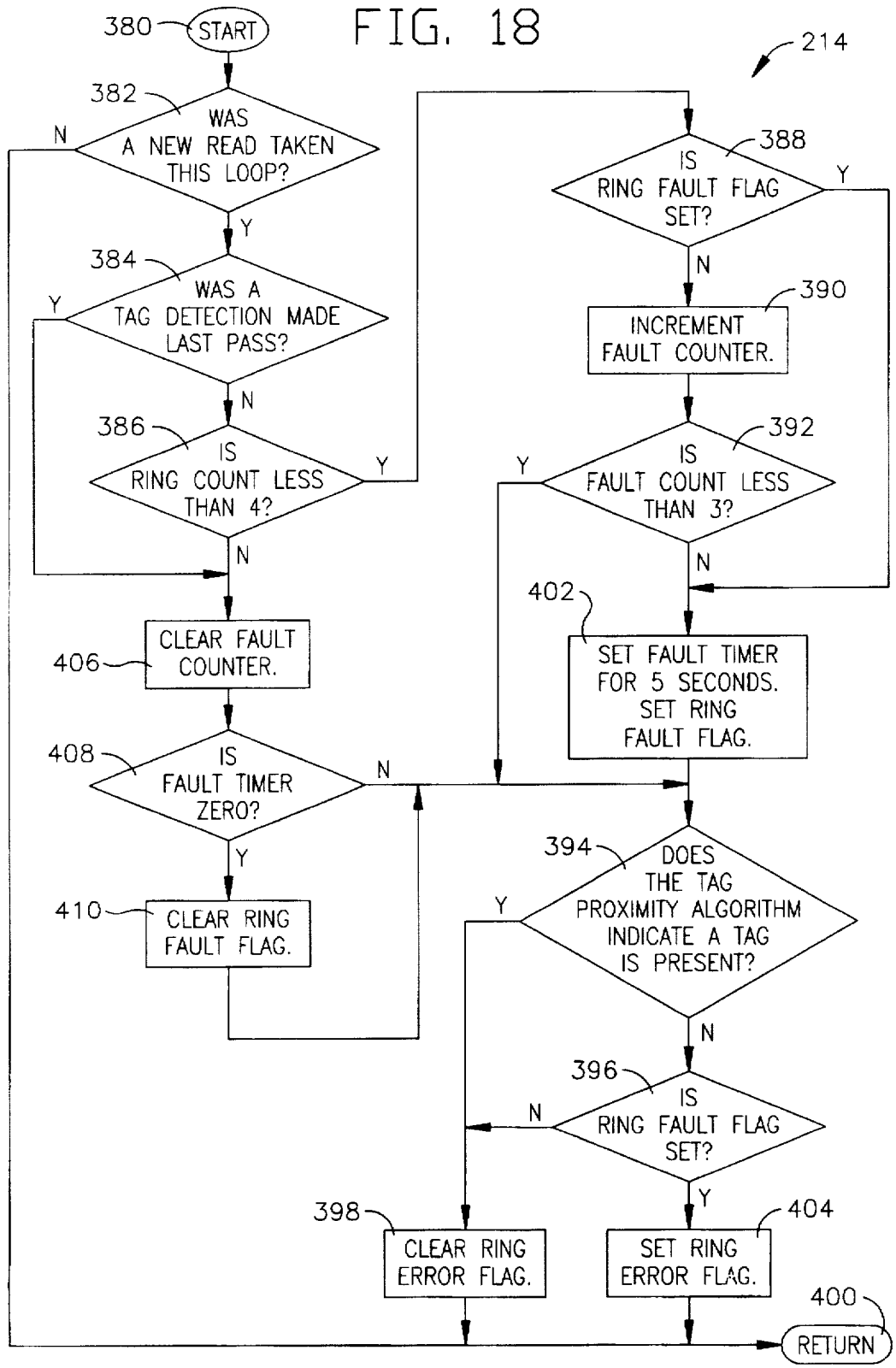

APPARATUS AND METHOD FOR SENSING A REARWARD FACING CHILD SEAT WITH ERROR DETECTION

TECHNICAL FIELD

The present invention is directed to a vehicle occupant restraint system and is specifically directed to an apparatus and method for sensing the presence of a rearward facing child restraint seat on a vehicle seat of a vehicle and preventing deployment of an air bag restraint.

BACKGROUND OF THE INVENTION

Air bag restraint systems for vehicles are well known in the art. It is also known to prevent deployment of an air bag during a vehicle collision when the air bag is associated with a seat location that is unoccupied. Deployment of an air bag associated with an unoccupied seat location (typically the passenger seat location) during a vehicle collision adds unnecessary expense to the repair of the vehicle.

To prevent such unnecessary deployment of an air bag at an unoccupied seat location, sensors are provided to detect the presence of an occupant on a vehicle seat. These sensors include pressure sensing switches located in the seat cushion and/or infrared or ultrasonic sensors located in the vehicle dashboard or instrument panel. If no occupant is detected as being present on the seat, deployment of the associated air bag during a vehicle collision is prevented through an appropriate control arrangement.

It is also desirable to prevent deployment of an air bag when a child restraint seat is secured in a rearward facing direction on the vehicle seat associated with the air bag.

SUMMARY OF THE INVENTION

The present invention provides an apparatus and method for sensing the presence of an object and, in particular, a rearward facing child restraint seat. The apparatus and method includes error detection arrangements.

Transmitter means of the apparatus provides a transmitted electromagnetic signal which exists during a transmission time period. Identifier means, securable to the object, provides an electromagnetic return signal in response to the transmitted electromagnetic signal. The electromagnetic return signal exists beyond the transmission time period. Receiver means receives electromagnetic return signals. The receiver means includes output means for providing an output which contains information. Determination means processes information contained within the output of the receiver means and determines whether the identifier means is present in response to the output of the receiver means. The determination means provides a signal indicative of the determination. Error detection means determines whether the output of the receiver means contains unreliable information and provides a signal indicative thereof. The error detection means includes means for processing the output from the receiver means outside of the transmission time period.

In accordance with one embodiment of the present invention, the error detection means includes means for determining whether the receiver means is receiving an electromagnetic return signal indicating the presence of the identifier means prior to the transmission time period. Also, in accordance with another embodiment of the present invention, the receiver means includes antenna means for receiving the received electromagnetic signals and providing a signal responsive to the received electromagnetic signals. The error detection means includes means for determining whether the antenna means is not functioning properly utilizing the output of the receiver means outside of the transmission time period.

The method includes securing an identifier means to the object. An electromagnetic signal is transmitted during a transmission time period. The identifier means provides an electromagnetic return signal in response to the transmitted electromagnetic signal. The electromagnetic identifier return signal exists beyond the transmission time period.

Electromagnetic return signals are received and an output is provided. The output contains information. The output is received and a determination is made whether the identifier means is present by processing information contained within the received output. A signal is provided which is indicative of the determination of whether the identifier means is present. A determination is made whether the output contains unreliable information. The determination of unreliability includes processing the output outside of the transmission time period. An error signal is provided when it is determined that the output is unreliable.

In accordance with one embodiment of the method of the present invention, the determination of unreliability includes determining whether an electromagnetic return signal indicating the presence of the identifier means is received prior to the transmission time period. Also, in accordance with another embodiment of the method of the present invention, an antenna means receives the received electromagnetic signals. The determination of unreliability includes determining whether the antenna means is not functioning properly utilizing the output outside of the transmission time period.

BRIEF DESCRIPTION OF THE DRAWINGS

Further features and advantages of the present invention will become apparent to those skilled in the art to which the present invention relates from reading the following description with reference to the accompanying drawings, in which:

FIGS. 6–8 are graphical representations of frequency components present in signals at certain locations of the circuit shown in FIG. 2 during certain occurrences;

FIGS. 11–18 are flow charts of a control process in accordance with the present invention performed within the processor shown in FIG. 2.

DESCRIPTION OF PREFERRED EMBODIMENT

Figure 1:
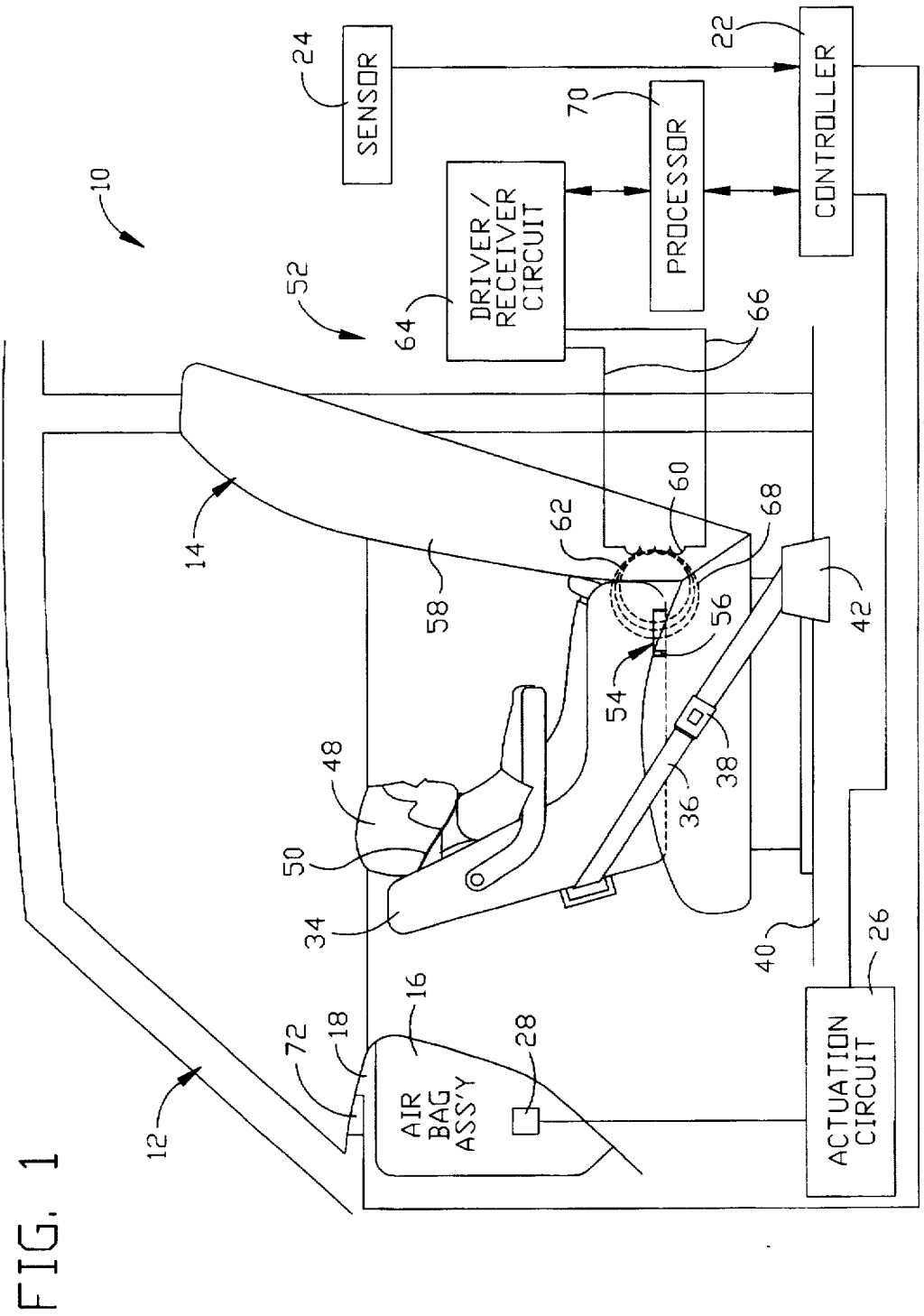
FIG. 1 is a schematic representation of an air bag restraint system including an apparatus made in accordance with the present invention.

An air bag restraint system 10 in a vehicle 12 is schematically shown in FIG. 1. The vehicle 12 includes a vehicle seat 14, which, for purposes of explanation, is a front passenger seat. An air bag assembly 16 is mounted in a dashboard 18 of the vehicle 12 in a manner well known in the art. An inflatable portion or air bag (not shown) of the air bag assembly 16 is inflated by means (not shown), such as an ignitable gas generating material and/or a container of pressurized gas, to extend into the occupant compartment of the vehicle 12 in front of the vehicle seat 14. The air bag assembly 16 may be any of several known air bag assemblies.

A controller 22 controls actuation of the air bag assembly 16 such that the air bag is inflated upon the occurrence of a condition indicative of a vehicle collision. A sensor 24 is mounted in the vehicle 12 and is operatively connected to the controller 22. The sensor 24 may be any of several known sensors, including an inertia switch or an accelerometer, that provide an electrical signal to the controller 22 upon the occurrence of a vehicle collision.

The controller 22 is controllably connected to an air bag actuation circuit 26. The actuation circuit 26 is electrically connected to an activator 28 within the air bag assembly 16. The activator 28 may be any suitable mechanism for initiating the inflation of the air bag by an inflator of the air bag assembly 16. For example, the activator 28 may be a squib which is operatively coupled to the inflator.

During operation of the vehicle 12, the controller 22 monitors the signal provided by the sensor 24. When the controller 22 determines a vehicle collision is occurring, the controller 22 provides a signal to the actuation circuit 26 to energize the activator 28. Energization of the activator 28 causes inflation of the air bag of the air bag assembly 16.

A child restraint seat 34 is secured to the vehicle seat 14 in a rearward facing direction by use of the seat belt system associated with the vehicle seat 14. A lap belt 36 of the seat belt system is fastened to a buckle 38 secured to the vehicle floor 40 through an anchor assembly 42. The lap belt 36 is received in a belt holder 44 of the child restraint seat 34 and is secured to the vehicle floor 40 on the other side (not shown) through a retractor assembly (not shown), all well known in the art. A child 48 is secured in the child restraint seat 34 using an over-both-shoulders harness restraint 50, such as a three point harness restraint of the type where two over-the-shoulder belts fasten to a between-the-legs buckle. Such belt systems are typical for a child restraint seat.

An apparatus 52 of the air bag restraint system 10 effects operation of the controller 22 to prevent actuation of the air bag assembly 16 when the rearward facing child restraint seat 34 is secured on the vehicle seat 14. An identification tag 54 of the apparatus 52 is attached to the child restraint seat 34. The identification tag 54 is made of a highly permeable amorphous material that is reactive when subjected to an oscillating electromagnetic (hereinafter referred to as "EM") signal having a particular frequency. Preferably, the identification tag 54 also includes a permanent magnet portion 56 that biases the amorphous material at the "knee" of a "BH" curve of the amorphous material.

As is known by those skilled in the art, the "BH" curve of the amorphous material is a plot of the magnetic flux density B as a function of the magnetic field intensity H. The "knee" of the "BH" curve is the region of the curve where the amorphous material exhibits a non-linear permeability. As a result of its bias at the non-linear "knee" of its BH curve, the amorphous material of the identification tag 54 vibrates at a certain frequency when the material is placed in an EM field resulting from an oscillating EM signal where the EM field has at least a minimum field strength, i.e., the identification tag material is magneto-strictive in response to the stimulus of the EM signal. The frequency of the vibration of the amorphous material is referred to as the natural resonant frequency of the identification tag 54. In one preferred embodiment, the natural resonance frequency is 52.6 kHz. The amorphous material of the identification tag 54 has the ability to store energy from electromagnetic stimulation in a mechanical form and this ability causes the amorphous material to continue to vibrate for a period of time after the stimulating EM signal terminates.

Preferably, the identification tag 54 is secured to the child restraint seat 34 with adhesive or is molded into a plastic portion of the child restraint seat during the seat's manufacture. In accordance with the embodiment shown in FIG. 1, the identification tag 54 is secured to the child restraint seat 34 such that, when the child restraint seat is secured in the rearward facing position on the vehicle seat 14, the identification tag is relatively near to a back portion 58 of the vehicle seat 14.

The apparatus 52 further includes an antenna 60. The antenna 60 transmits an EM field or signal 62, hereinafter referred to as the EM transmit signal, which permeates the space surrounding the antenna 60. An electrical transmit signal is applied to the antenna 60 by a driver portion of a driver/receiver circuit 64 via electrical leads 66 to excite the antenna so as to transmit the EM transmit signal 62. The antenna 60 also receives any EM return signal permeating the space surrounding the antenna.

An electrical return signal appearing across the leads 66 of the antenna 60 is received or "seen" by a receiver portion of the driver/receiver circuit 64. The electrical return signal changes over the course of time because the components which make-up the electrical return signal vary and also each component may come into and go out of existence. In particular, during transmission of the EM transmit signal the electrical return signal is the result of a combination of the electrical transmit signal and an electrical signal caused by any EM return signals present at that time.

The amorphous material of the identification tag 54 vibrates when the identification tag is placed in the near field of the EM transmit signal 62 of the antenna 60. The vibrating material of the identification tag 54 provides an EM return signal 68 which permeates the space surrounding the identification tag. Since the strength of both the EM transmit signal 62 from the antenna 60 and the EM return signal 68 from the identification tag 54 diminishes quickly as a function of the distance from the identification tag or the antenna (e.g., at least as rapidly as the distance is squared and more so for larger wavelength signals), the distance between the antenna and the identification tag is important.

There are three possible cases of interaction between an identification tag and an antenna. The first case is when an identification tag is very near to an antenna. An EM transmit signal from the antenna has sufficient strength to excite the identification tag, and the identification tag stores sufficient energy to provide an EM return signal of sufficient strength to excite the antenna. Accordingly, the identification tag can be detected.

The second case is when an identification tag is somewhat near to an antenna. An EM transmit signal from the antenna has sufficient strength to excite the identification tag, but the identification tag does not store sufficient energy to provide an EM return signal of sufficient strength to excite the antenna. Accordingly, the identification tag cannot be detected.

The third case is when an identification tag is distant from an antenna. An EM transmit signal from the antenna does not excite the identification tag, and the identification tag does not provide an EM return signal. The identification tag cannot be detected.

Accordingly, the identification tag 54 is located on the child restraint seat 34 and the antenna 60 is located within the vehicle 12, e.g., within the back portion 58 of the vehicle seat 14, such that very little distance separates the identification tag from the antenna when the child restraint seat is located in the rearward facing position on vehicle seat 14. Specifically, the distance between the identification tag 54 and the antenna 60 must be less than a predetermined distance to ensure that the EM transmit signal 62 transmitted by the antenna is strong enough to cause vibration of the identification tag and storage of sufficient energy by the identification tag to provide the EM return signal 68. It is to be understood that the location of the identification tag 54 on the child restraint seat 34 and the location of the antenna 60 may be changed so long as the position of the antenna remains relatively near to the identification tag when the child restraint seat is in the rearward facing position on the vehicle seat 14. Further, it is to be understood that the antenna 60 may be located elsewhere within the vehicle 12 other than within the vehicle seat 14 as long as the relative distance factor between the antenna and tag is observed for detection of a rearward facing child restraint seat. Also, the positions of the antenna 60 and identification tag 54 are such that, if the child restraint seat 34 were secured on the vehicle seat 14 in a forward facing direction, the signal strength from the antenna 60 would not effect a reaction from the identification tag.

The driver/receiver circuit 64 is operatively connected to a processor 70. The driver/receiver circuit 64 provides an electrical signal to the processor 70 that contains information indicative of the presence or absence of the rearward facing child restraint seat 34. The information regarding the presence of the rearward facing child restraint seat 34 is based upon information regarding whether the identification tag 54 is located within the near field of the EM transmit signal from the antenna 60. The processor 70 processes the information contained in the signal from the driver/receiver circuit 64 and determines whether a child restraint seat is present in the rearward facing position on the vehicle seat 14 (i.e., the identification tag is present in the near field of the antenna 60). The processor 70 also determines whether the electrical signal provided by the driver/receiver circuit 64 contains unreliable information, e.g., interfering or extraneous EM signals exist.

When the processor 70 determines that the child restraint seat 34 is in the rearward facing position on the vehicle seat 14, the processor provides a rearward facing child seat presence indicating signal to the controller 22. In response to the rearward facing child seat presence indicating signal generated by the processor 70, the controller 22 prevents a "fire" signal from being output to the actuation circuit 26 so that the actuation circuit will not energize the activator 28 regardless of whether the sensor 24 provides a signal to the controller 22 indicative of the occurrence of a vehicle collision. Accordingly, the controller 22 prevents deployment of the inflatable portion of the air bag assembly 16 when the child restraint seat 34 is present and in the rearward facing position.

Also, the controller 22 is controllably connected to a warning light panel 72 visibly mounted within the vehicle 12, such as on the dashboard 18. The warning light panel 72 has one or more warning lights which are readily visible to an operator (not shown) of the vehicle 12. When the controller 22 is going to prevent activation of the activator 28, the controller causes at least one of the warning lights on the warning light panel 72 to be illuminated to notify the vehicle operator that the air bag assembly 16 associated with the location of the rearward facing child restraint seat 34 has been disabled.

If the signal provided by the driver/receiver circuit 64 contains unreliable information, then the processor 70 is not able to make a determination with a high degree of certainty as to the presence of the child restraint seat 34. When the processor 70 determines that the signal provided by the driver/receiver circuit 64 contains unreliable information, the processor 70 provides a signal to the controller 22 indicative of the unreliability which prevents the determination of whether the child restraint seat 34 is present. When such unreliability occurs, the controller 22 causes at least one of the warning lights on the warning light panel 72 to be illuminated to notify the vehicle operator of the unreliable information being received by the processor 70. This can take the form of a simple system error signal that illuminates an error light on panel 72.

The driver/receiver circuit 64 (FIG. 2) includes a clock device 80 which provides a continuous oscillating electrical output signal on output line 82. In one preferred embodiment, the frequency of the output signal of the clock device 80 is 4 MHz.

A frequency divider 84 is connected to the line 82 and receives the output signal from the clock device 80. The frequency divider 84 divides the frequency of the output signal from the clock device 80 by an integer divisor and provides an output signal on line 88 with a frequency equal to the result of the division. In the preferred embodiment, the frequency divider 84 is controllable to select the integers for use as the divisor. Within the frequency divider 84, the integer divisor is changeable so that the frequency of the output signal from the frequency divider 84 can be selected to be either a first frequency or a second frequency. The frequency divider 84 selects the integer for the divisor, and hence the frequency of the output signal on output line 88 from the frequency divider 84, in response to a frequency change signal provided to the frequency divider 84 on a line 86.

At an initial point in time, the frequency change signal causes the output signal from the frequency divider 84 to have the first frequency. The output signal at the first frequency exists for a first time period. At a second point in time, the frequency change signal causes the output signal from the frequency divider 84 to have the second frequency. The output signal at the second frequency exists for a second time period. The frequency change signal on line 86, and thus the changing of the frequency of the output signal from the frequency divider 84, is repeatedly cycled. Thus, the initial time at the beginning of the first time period (output of the frequency divider at the first frequency) is repeated over and over. In the preferred embodiment, the first time period is 2 milliseconds (ms) and the cycle time is approximately 200 ms.

The natural resonant frequency of the identification tag 54 is matched, or at least closely approximated, by having the frequency divider 84 divide the frequency of the output signal from the clock device 80 by a certain predetermined integer. This matched frequency is the first frequency output from the frequency divider 84. In the preferred embodiment, an integer of seventy-six (76) is used as the divisor during the first time period such that the first frequency of the output signal from the frequency divider 84 is approximately 52.6 kHz (4 MHz÷76). This frequency is selected so as to be substantially the same as the natural resonant frequency (52.6 kHz, in accordance with the preferred embodiment) of the amorphous material of the identification tag 54. Also, in the preferred embodiment, an integer of seventy (70) is used as the divisor during the second time period such that the second frequency of the output signal from the frequency divider 84 is approximately 57.1 kHz (4 MHz÷70). The difference between the first and second frequencies is 4.5 kHz.

The output line 88 from the frequency divider 84 is connected to an input of a gating device 90. The gating device 90 has pass and block states. In the pass state, the gating device 90 passes the output signal of the frequency divider 84 to the output terminal of the gating device. In the block state, the gating device 90 does not pass the output signal from the frequency divider 84 but, instead, outputs a steady-state LOW signal. The gating device 90 is controlled in response to an enable signal on an enable input line 92.

Figure 3:
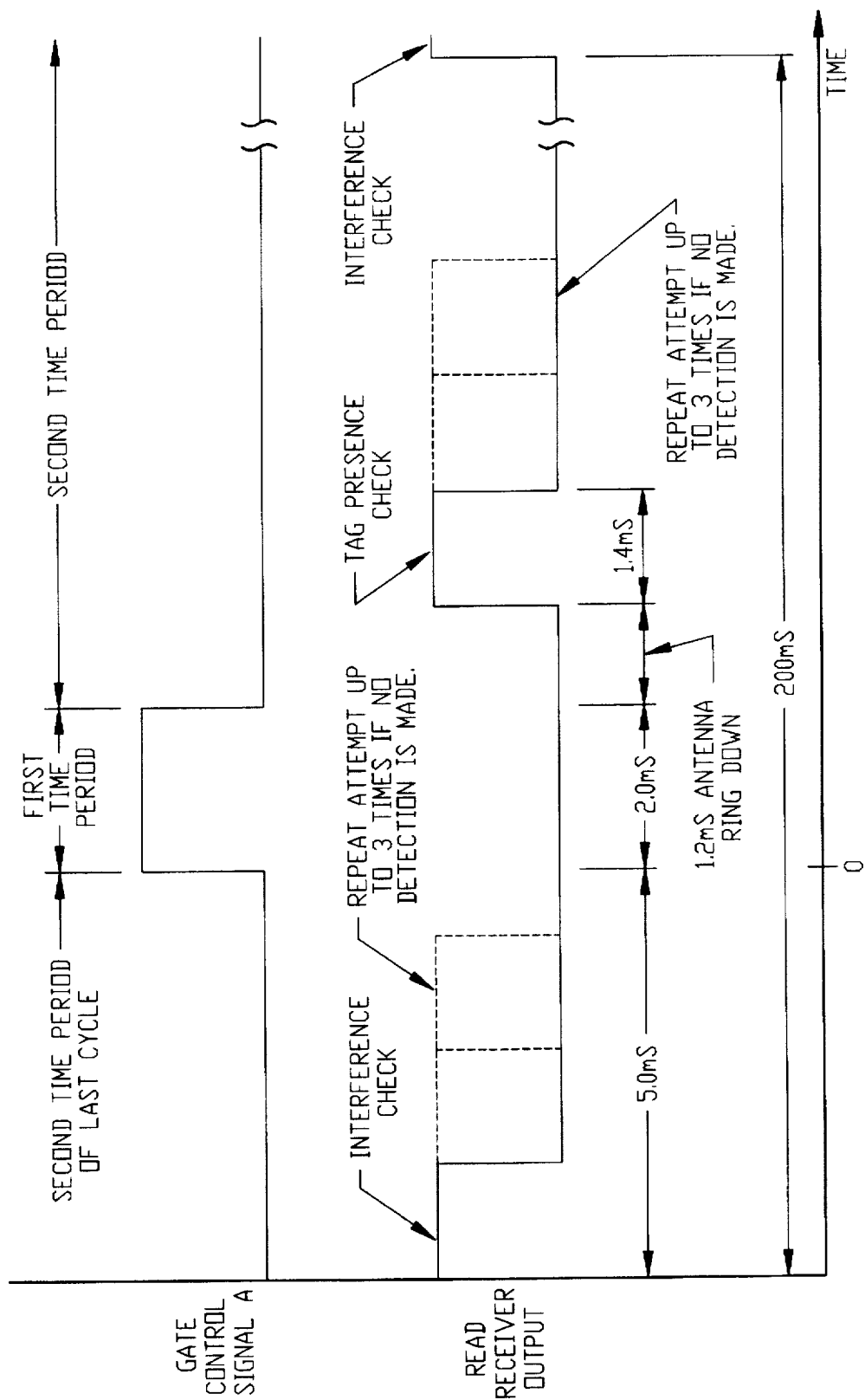
FIG. 3 is a graphical representation of an investigation cycle of the apparatus of FIG. 1.

A HIGH signal on the enable line 92 results in the device 90 being in the pass state. A LOW on the enable line 92 drives the gating device 90 to a block state. Trace A in FIG. 3 shows a gate control signal on enable line 92. When the gate control signal A steps up to a relative HIGH, the gating device is in its pass state. When the enable signal drops to a relative LOW, the gating device 90 switches from its pass state to its block state.

The change in states of the enable signal on enable line 92 to the gating device 90 occurs simultaneously with the frequency change signal to the frequency divider 84 on line 86. Accordingly, the gating enable signal is HIGH during the first time period and the gating enable signal is LOW during the second time period. During the first time period, the output signal from the frequency divider 84 and the gating device 90 are oscillating signals having the first frequency. During the second time period, the output signal from the gating device 90 is steady-state LOW, while the output signal of the frequency divider 84 is at the second frequency.

An output line 94 of the gating device 90 is connected to an amplifier 96, and the output signal from the gating device is amplified. An output line 98 from the amplifier 96 is connected to a combiner circuit 100. The combiner circuit 100 is connected to the antenna 60 by the leads 66. The amplified oscillating signal from the gating device 90 is the electrical transmit signal. The combiner circuit 100 imposes the electrical transmit signal on the antenna 60, causing the antenna to transmit the EM transmit signal 62 with the same frequency as the output signal from the gating device 90, i.e. the first frequency during the first time period. The EM transmit signal 62 terminates when the gating enable signal on enable line 92 drops LOW and the gating device 90 switches to its blocking state.

The antenna 60 does "ring-down" once the excitation from the electrical transmit signal ceases. The occurrence of ring-down is well known in the art. The ring-down of the antenna 60 is at the same frequency at which the antenna 60 was being excited by the electrical transmit signal. Specifically, the antenna 60 rings-down at the first frequency provided by the frequency divider 84. The ringing-down of the antenna 60 is relatively quick due to the low Q factor of the antenna.

When the identification tag 54 is present in the space through which the EM transmit signal 62 (at the first frequency value) radiates with sufficient strength, the identification tag vibrates at the natural resonant frequency and provides the EM return signal 68 at its natural resonant frequency, i.e., the first frequency. When the EM transmit signal 62 terminates, the EM return signal 68 from the identification tag 54 continues for a certain amount of time because of the energy storage effect of the amorphous material. The EM return signal 68 causes the antenna 60 to provide an electrical return signal component at the first frequency on its leads 66.

In addition to the component of the electrical return signal which results from the EM return signal 68 from the identification tag 54, the electrical signal may further includes components due to ring-down of the antenna 60, and any other stray EM signals received. Because the circuitry at this point does not discriminate between signals from different origins, the collective signal "received" is referred to herein as the electrical return signal. The combiner circuit 100 extracts the electrical return signal and supplies this signal to an output line 102 of the combiner circuit. The output line 102 of the combiner circuit 100 is connected to an input clamp 104.

The input clamp 104 limits the amplitude of the electrical return signal received on the line 102. For example, the input clamp 104 limits the voltage amplitude to 1.5 volt peak-to-peak. The input clamp 104 prevents relatively large amplitude signals, such as the relatively large electrical output signal coming from the amplifier 96, and "seen" through the combiner circuit 100 during the first time period, from damaging electrical components within the driver/receiver circuit 64 that are "downstream" from the antenna 60 and combiner circuit 100. An output line 106 from the input clamp 104 is connected to an input of an intermediate frequency amplifier 108. The electrical return signal passing through the input clamp 104 is amplified by amplifier 108.

An output line 110 from the amplifier 108 is connected to an input of a band-pass filter 112. The band-pass filter 112 passes a narrow range of frequencies centered on the natural resonant frequency of the identification tag 54, i.e., the first frequency. In the preferred embodiment, the band-pass filter 112 is centered on 52.6 kHz. An output line 114 from the band-pass filter 112 is connected to an input of a limiter 116. The electrical return signal passing through the band-pass filter 112 is amplitude limited by limiter 116. Accordingly, the electrical return signal from the antenna 60 has been clamped, amplified, filtered, and limited. The processed electrical return signal is output from the limiter 116 on an output line 118. For purposes of discussion, the processed electrical return signal which has been clamped, amplified, filtered, and limited is still referred to as the electrical return signal because the signal characteristics of concern of the electrical return signal (i.e., frequency and duration) remain intact.

A mixer 122 has two inputs, one of which is connected to the output line 88 from the frequency divider 84 and the other of which is connected to the output line 118 from the limiter 116. The mixer 122 combines or mixes the electrical return signal with the output signal from the frequency divider 84. The product of the mixing within the mixer 122 is a resultant electrical signal which is provided to an output line 124 of the mixer 122.

The resultant electrical signal from the mixer 122 has frequency components from the output signal of the frequency divider 84 and from the electrical return signal. Specifically, the mixer 122 combines the signals so that the resultant signal from the mixer 122 has beat frequencies. Beat frequencies are functionally related to the sum and difference of the frequencies of the combined signals. In the present invention, one beat frequency is derived from the sum of the frequencies from the output signal of the frequency divider 84 and the electrical return signal, and another beat frequency is derived from the difference of the frequencies.

The output line 124 from the mixer 122 is connected to an input of a band-pass filter 126. The band-pass filter 126 passes a range of frequencies centered on the beat frequency which is the difference between the first and second frequencies. In the preferred embodiment, the band-pass filter 126 is centered on 4.5 kHz. The output line 128 of the band-pass filter 126 is connected to a comparator 130. The comparator 130 generates an electrical signal having a positive pulse (i.e., a switch from LOW to HIGH and back to LOW) for each oscillation in the output signal from the band-pass filter 126 which exceeds a predetermined amplitude value.

Focusing upon the driver/receiver circuit 64, several occurrences and time frames are to be appreciated. First, consider the case where there is no extraneous EM signal stimulating the antenna 60 (i.e., no interference) and the antenna of apparatus 52 is functioning properly. During the first time period (i.e. when the gating device 90 is in the pass state and the output signal of the frequency divider 84 is at the first frequency), the electrical transmit signal is applied to the leads 66 of the antenna 60. Thus, the first time period is also termed a transmission time period. The EM transmit signal 62 is generated and permeates around the antenna 60. Also, the electrical transmit signal is "seen" through the combiner circuit 100 by the input clamp 104.

The first input to the mixer 122 is the output signal from the frequency divider 84 at the first frequency. The second input to the mixer 122 is an electrical return signal derived from the electrical transmit signal "seen" through the combiner circuit 100. The frequency of the two input signals to the mixer 122 are the same during the first time period (i.e., both are the first frequency). Accordingly, the resultant output signal provided by the mixer 122 does not contain a beat frequency component which is at, or even near, the range of frequencies which will pass through the band-pass filter 126.

During this first time period, the output signal from the band-pass filter 126 is at or near a steady-state LOW value, except for the occurrence of noise. The output signal from the band-pass filter 126 does not have sufficient amplitude to cause the comparator 130 to provide a pulse in the output signal from the comparator. Accordingly, the output signal from the comparator 130 remains LOW.

Figure 4:
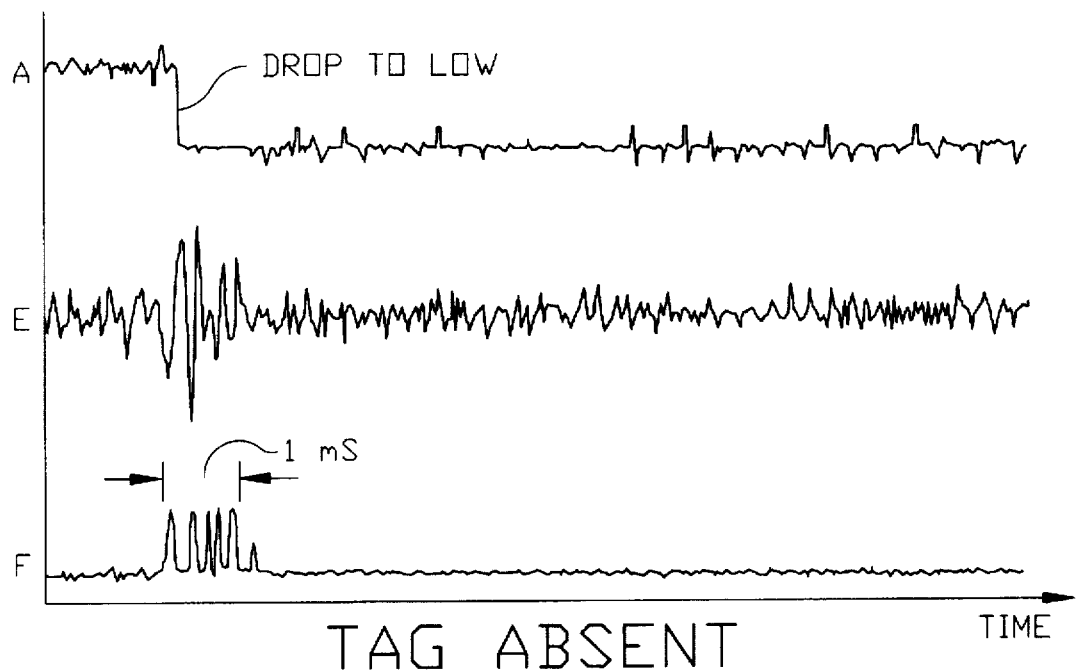
FIGS. 4 and 5 are graphical representations of signals at certain locations of the circuit shown in FIG. 2 during certain occurrences.
Figure 5:
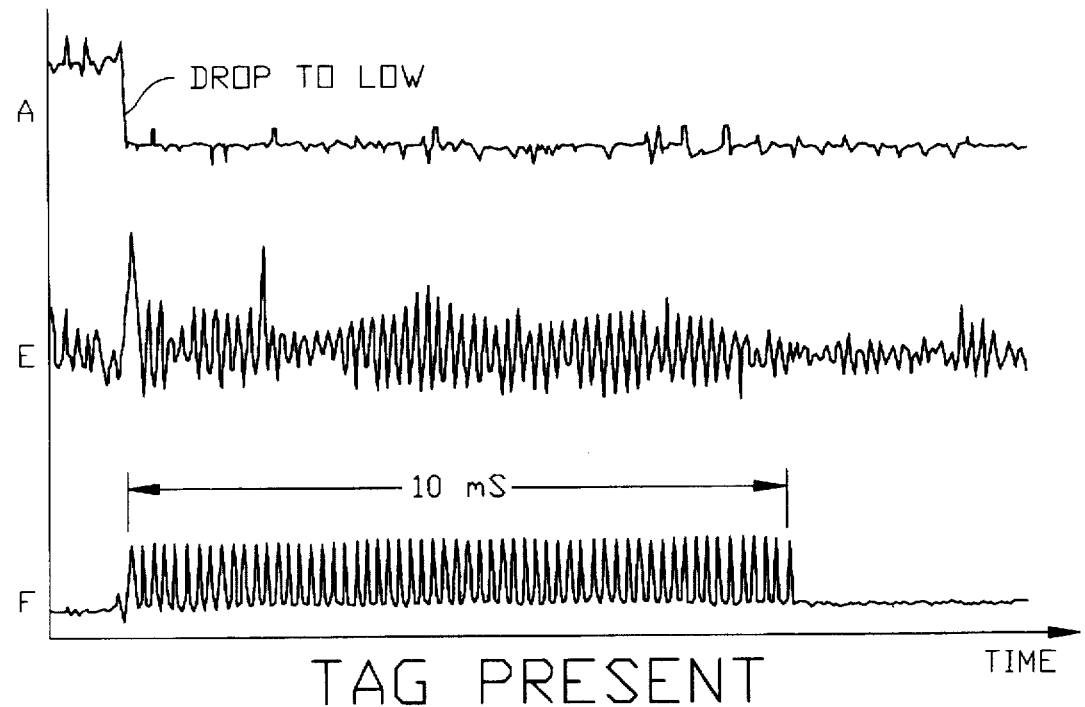

When the gating enable signal on the enable line 92 switches LOW (examples shown if FIGS. 4 and 5, trace A) and causes the gating device 90 to change to its blocking state and terminate its oscillating output signal (i.e., at the beginning of the second time period), the antenna 60 rings-down (FIG. 3). It is to understood that the time durations identified in FIGS. 3–5 are for the preferred embodiment. The ring-down effect of the antenna 60 (FIG. 2) is at the first frequency and is relatively short. Also at the beginning of the second time period, the frequency divider 84 switches to the second frequency. Thus, the first input to the mixer 122 is the output signal from the frequency divider at the second frequency which is shown in FIG. 6, signal representation B. It is to understood that the frequencies identified in FIGS. 6–8 are for the preferred embodiment.

Figure 2:
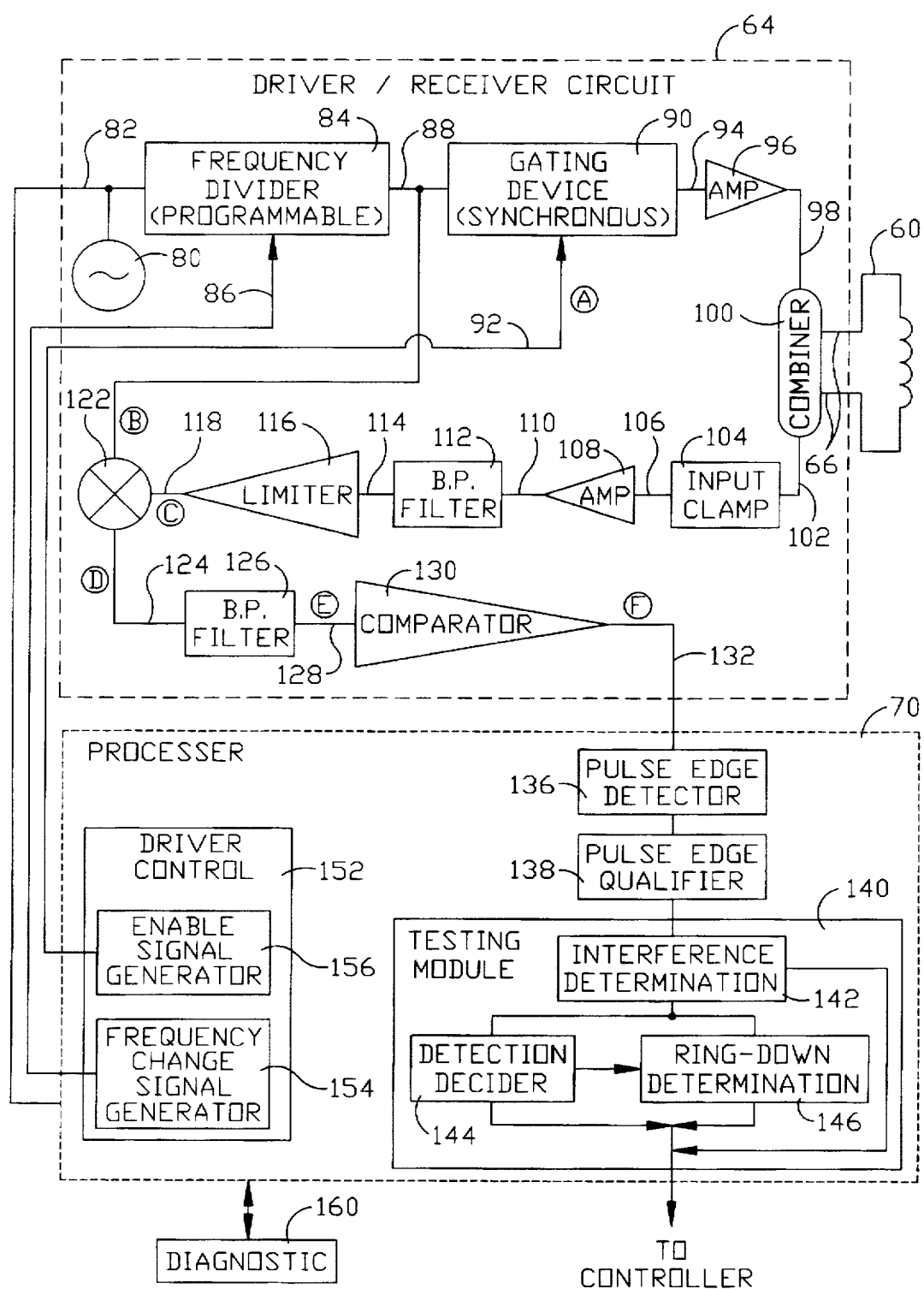
FIG. 2 is a schematic of the driver/receiver circuit and the processor shown in FIG. 1.

The second input to the mixer 122 is a return signal derived from (i) the ring-down of the antenna 60, and (ii) if the identification tag 54 is present, the EM return signal 68, both of which are at the first frequency (FIG. 6, signal representation C). The two input signals (FIG. 6, representations B and C) to the mixer 122 have different frequencies (i.e., the first and the second frequencies) and the resultant output signal (FIG. 7, frequency spectrum representation D) from the mixer will contain a component at or near the beat frequency derived from the difference of the two frequencies. The band-pass filter 126 provides an output signal (FIGS. 4 and 5, trace E, and FIG. 8, representation E) at the beat frequency. The comparator 130 provides a pulsing output signal (FIGS. 4 and 5, trace F) which lasts for a duration dependent upon the duration of the beat frequency signal passing through the band-pass filter 126 (FIG. 2).

Consider now the case where there is an extraneous EM signal stimulating the antenna 60 (i.e., EM interference such as from other electrical components). During the first time period, the ultimate result is similar to case when interference is not present. During the second time period, the second input to the mixer 122 (FIG. 2) is a return signal derived from (i) the ring-down of the antenna 60, (ii) if the identification tag 54 is present, the EM return signal 68, and (iii) the extraneous EM signal. If the Extraneous EM signal has a frequency outside of the range of frequencies passed by the band-pass filter 112, then the output signal from the comparator 130 is not corrupted because the band-pass filter 112 filters out the effects of the extraneous EM signal.

Figure 9:
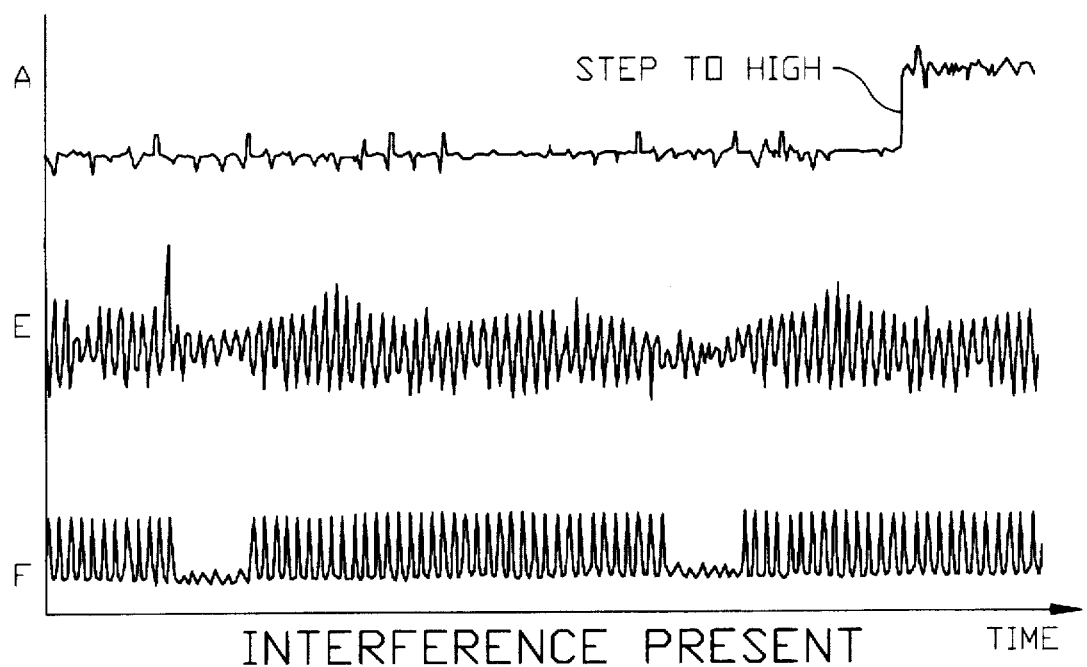
FIGS. 9 and 10 are graphical representations of signals at certain locations of the circuit shown in FIG. 2 during certain occurrences.

However, if the extraneous EM signal has a frequency within the range of frequencies passed by the band-pass filter 112 (trace E, FIG. 9), then the output signal from the comparator 130 during the second time period is corrupted. Specifically, the corruption caused by the extraneous EM signal results in pulses in the output signal of the comparator 130 (trace F, FIG. 9). Pulses in the output signal of the comparator 130 are ideally caused only from the ring-down of the antenna 60 and the EM return signal 68 from the identification tag 54. The corruption may rise to the level that the pulsing output signal from the comparator 130 may "look" like a signal resulting from the presence of an identification tag, even if an identification tag is not present.

Consider now the case where the antenna 60 is not functioning properly (e.g., one of the leads 66 is broken). During the first time period, the ultimate result is similar to case when the antenna is functioning properly. The electrical transmit signal is "seen" through the combiner circuit 100 by the input clamp 104 despite the fact that the electrical transmit signal does not stimulate the antenna 60 to provide the EM transmit signal 62.

However, during the second time period the input clamp 104 does not receive any input. The antenna 60 does not ring-down because the antenna is not excited. The identification tag 54 is not stimulated because the EM transmit signal 62 is not provided. Also, the antenna 60 does not provide any electrical signal in response to any EM signals.

Figure 10:
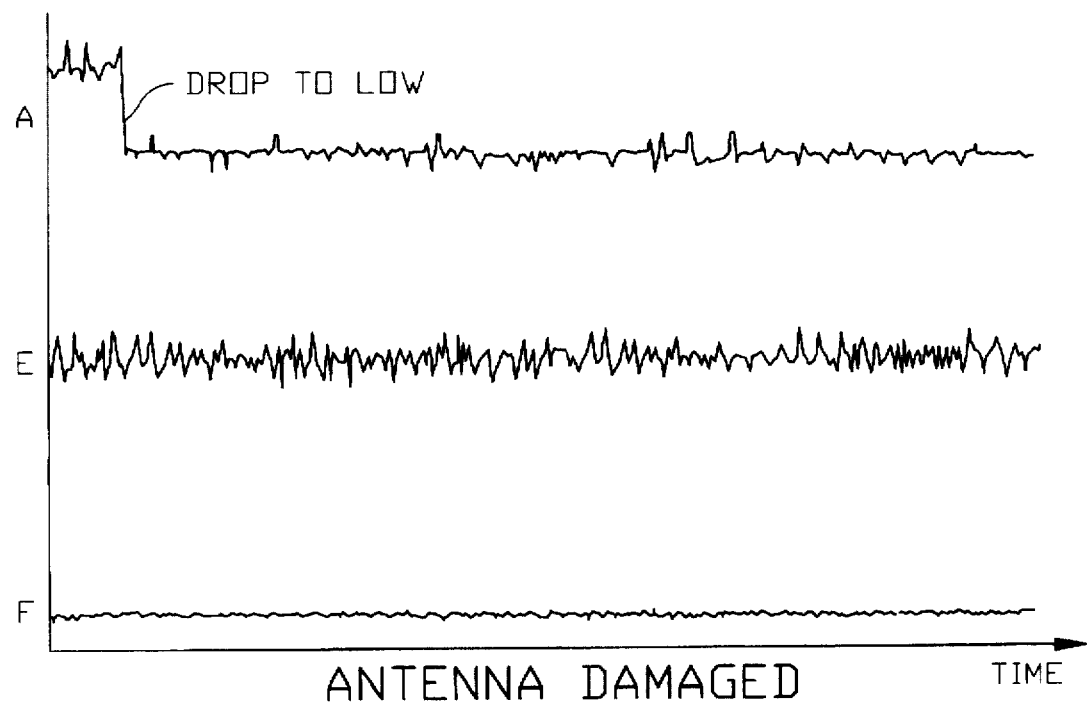

A signal provided on the output line 118 from the limiter 116 as an input to the mixer 122 is a steady state LOW. Accordingly, the resultant output signal provided by the mixer 122 does not contain a beat frequency component which is at, or even near, the range of frequencies which will pass through the band-pass filter 126. The output signal from the band-pass filter 126 is at or near a steady-state LOW value, except for the occurrence of noise (trace E, FIG. 10). The output signal from the band-pass filter 126 does not have sufficient amplitude to cause the comparator 130 to provide a pulsing output signal. Accordingly, the output signal from the comparator 130 remains LOW (trace F, FIG. 10). Thus, even if an identification tag 54 is present, the comparator 130 does not provide a signal indicative of the presence of the identification tag.

The processor 70 is responsive to the above-mentioned scenarios. An output line 132 (FIG. 2) from the comparator 130 is connected to the processor 70. The processor 70 preferably includes a microcomputer which performs numerous functions. The processor 70 includes a pulse edge detector function 136. The pulse edge detector 136 reacts to a leading edge of each pulse in the output signal from the comparator 130 and provides a digital signal indicative of each pulse.

The output signal from the pulse edge detector 136 is provided to a pulse edge qualifier function 138. The pulse edge qualifier 138 counts the number of pulse indications provided by the pulse edge detector 136. The pulse edge qualifier 138 is preset to determine if a predetermined number of pulses in the output signal from the comparator 130 is detected by the pulse edge detector 136 within a predetermined time period. The pulse edge qualifier 138 prevents further processing of the detected pulses in the output signal from the comparator 130 if at least the predetermined number of pulses within the predetermined time period does not occur. This minimum pulse count requirement serves to filter spurious pulses that may result from spurious EM signals received.

If the criteria within the pulse edge qualifier 138 is satisfied, the signal from the pulse edge detector 136 is provided to a testing module 140. The testing module 140 has several functions, including an interference determination function 142, a detection decider function 144, and a ring-down determination function 146. Also, the testing module 140 provides signals to the controller 22 indicative of the determinations within the testing module.

The interference determination 142 counts the number of detected pulses in the output signal of the comparator 130 during a portion of the second time period when all signal activity from the antenna ring-down and the EM return signal 68 from an identification tag 54 should have ceased. This portion of the second time period is toward the end of the second time period, just prior to the start of the first time period for the next cycle of the driver/receiver circuit 64 (See the interference check portion of the time line in FIG. 3). If EM interference is not present, then there are no detected pulses to count because the pulses resulting from the antenna ring-down and the presence of the identification tag 54 do not occur during this portion of the second time period. If EM interference is not present, then the interference determination 142 (FIG. 2) provides a signal indicating the absence of EM interference to other portions of the testing module 140, which then permits further testing and determinations within the testing module to occur. Also, the signal from the interference determination 142 is provided to the controller 22.

However, if EM interference induced pulses are present in the output signal of the comparator 130, the interference determination 142 determines if the number of detected pulses within a predetermined time period is within a predetermined numeric range. In one respect, the interference determination 142 performs a frequency measurement. In the preferred embodiment, the frequency measurement performed by the interference determination 142 "looks" for a frequency at or near 4.5 kHz.

If the pulsing output signal from the comparator 130 caused by the EM interference exists for a sufficiently long time, the n the pulsing output signal has the appearance of being created because of the presence of an identification tag 54. Thus, if the number of detected pulses in the output signal from the comparator 130 within the predetermined time period is within the predetermined range and if the duration of the pulsing output signal from the comparator exceeds the predetermined time period, the interference determination 142 provides a signal which indicates that EM interference is present in a form which would prevent a correct determination by the detection decider 144 as to whether an identification tag 54 is present. The output signal from the interference determination 142 is provided to other portions of the testing module 140 and the controller 22. This signal indicates that the information (e.g., the occurrence, frequency, and duration of the pulses) contained within the output signal of the comparator 130 is unreliable as to whether it can be determined that an identification tag is present. The signal from the interference determination 142 prevents a determination being made by the detection decider 146 as to the presence of the identification tag 54 because the detection decider cannot reliably make such a de termination. The EM interference may cause a false determination that the identification tag 54 is present.

The detection decider 144 proceeds with the determination as to the presence of an identification tag only if interference is not detected. The detection decider 144 is active during a portion of the second time period which is shortly after the end of the first time period (See the tag presence check portion of the time line of FIG. 3). A short delay after the end of the first time period allows the antenna 60 to ring-down. If an identification tag 54 is present, then the EM return signal 68 provided by the identification tag causes the pulsing output signal from the comparator 130 when the detection decider 144 is active.

The detection decider 144 counts the number of detected pulses in the output signal of the comparator 130 and determines if the number of detected pulses within a predetermined time period is within a predetermined numeric range. Thus, in one respect, the detection decider 144 (FIG. 2) performs a frequency measurement. In the preferred embodiment, the frequency measurement performed by the detection decider 144 "looks" for a frequency at or near 4.5 kHz. The duration of the pulsing output signal from the comparator 130 is related to the duration of the oscillating output signal from the band-pass filter 126. If an identification tag 54 is present, the pulsing output signal from the comparator 130 will last longer than the predetermined time period set within detection decider 144. If the number of detected pulses in the output signal from the comparator 130 within the predetermined time period is within the predetermined range and if the duration of the pulsing output signal from the comparator exceeds the predetermined time period, the detection decider 144 provides a signal which indicates that the identification tag 54 is present. The output signal from the detection decider 144 (i.e., a tag is present or a tag is not present) is provided to other portions of the testing module 140 and to the controller 22.

The ring-down determination 146 determines whether the output signal of the comparator 130 indicates a ring-down of the antenna 60 when it is expected that the antenna should be ringing-down. The determination of the ring-down determination 146 is directed to the issue of whether the antenna 60 is functioning properly. If the antenna 60 is not function properly, then the output signal from the comparator 130 may not contain pulses when an identification tag 54 is present.

Recall that the antenna 60 rings-down immediately after the electrical transmit signal terminates, if the antenna is functioning properly. Thus, the ring-down determination 146 is only active during the portion of the second time period immediately following the end of the first time period (i.e., the end of the transmission time period, see the time line of FIG. 3).

The ring-down determination 146 (FIG. 2) counts the number of detected pulses in the output signal from the comparator 130 within a predetermined time period (e.g., 1.2 ms), which begins at the termination of the first time period (transmission time period), and determines if the number of detected pulses is within a predetermined numeric range. Further, in the preferred embodiment, the period of the adjacent pulses must exceed 70 microseconds. Thus, in one respect, the ring-down determination 146 performs a frequency measurement. In the preferred embodiment, the frequency measurement performed by the ring-down determination 146 "looks" for a frequency at or near 4.5 kHz.

The predetermined numeric range may be selected to be a relatively broad numeric range. A broad numeric range allows for a relatively large variation in the count number of detected pulses which fall within the numeric range and thus permits a relatively large variation of acceptable frequencies. The tolerance of frequency variation is possible because the occurrence of a precise frequency antenna ring-down is not as important as the occurrence of the antenna ring-down itself. In the preferred embodiment, the numeric range is selected to be greater than or equal to four (4). If less than four (e.g., zero) pulses are detected within the 1.2 ms time period in which ring down would typically occur, then the determination of the ring-down determination 146 is that a proper ring-down did not occur and that the antenna 60 is, therefore, not functioning properly.

The ring-down determination 146 provides a signal to controller 22 indicative of the determination of whether an antenna ring-down occurs. A signal indicating that ring down did not occur indicates that the information (e.g., the occurrence, frequency, and duration of the pulses) contained within the output signal of the comparator 130 is unreliable. The signal from the ring-down determination 146 is provided to other portions of the processor 70 and to the controller 22.

The processor 70 further includes a driver control 152 which has a frequency change signal generator 154 and a gating enable signal generator 156. The frequency change signal generator 154 provides the frequency change signal on the line 86 to the frequency divider 84. The enable signal generator 156 provides the gating enable signal on the enable line 92 to the gating device 90. The frequency change signal generator 154 is synchronized with the enable signal generator 156 such that gating enable signal and the frequency change signal switch simultaneously. Also, driver control 152 is synchronized with other portions of the processor 70, specifically, the testing module 140 so that the functions of the testing module are performed at the appropriate times. A diagnostic control 160 is operatively connected with the processor 70 to enable error determination and to provide corrective measures if an error is detected within the processor.

The driver control 152 cycles through the first and second time periods by causing the frequency change signal generator 154 and the enable signal generator 156 to switch states. At the beginning of each cycle (time point 0 on the time line in FIG. 3), the enable signal generator 156 (FIG. 2) provides the signal to cause the gating device 90 to change to the pass state and the frequency change signal generator 154 provides the signal to cause the frequency divider 84 to provide its output signal at the first frequency. When this occurs, the previous second time period of the previous cycle ends and the first time period (the transmission time period) of the present cycle begins.

At the end of the first time period, the enable signal generator 156 terminates its signal to cause the gating device 90 to change to the block state and the frequency change signal generator 154 provides the signal to cause the frequency divider 84 to provide its output signal at the second frequency. As should be understood, the second time period is an interrogation period, i.e., the apparatus 52 is "looking" for: (i) antenna ring-down, (ii) the identification tag 54, and (iii) EM interference. The cycling continues so that, periodically, the driver control 152 again causes the frequency change signal generator 154 to provide the switch frequency signal and the enable signal generator 156 to provide the enable signal.

Referring to FIGS. 11–18, one specific example of the control process performed by the processor 70, in accordance with the present invention, will be appreciated. The process (FIG. 11) includes performance of the functions of the interference determination 142 (FIG. 2), the detection decider 144 and the ring-down determination 146. The process (FIG. 11) also includes performance of controlling the signals from the frequency change signal generator 154 (FIG. 2) and the enable signal generator 156, and providing signals to the controller 22. The process is described in a successive levels of hierarchy, with the functions of main subprocesses being described first and examples of implementations of the subprocesses being described subsequently.

The process (FIG. 11) is initiated at step 200 and proceeds to step 202 where initial states within the processor 70 are set, flags set, memories cleared, etc. The process proceeds from step 202 into a main process loop which contains several subprocess routines. The main process loop is continuously repeated when the processor 70 is operating (e.g., when the ignition of the vehicle is ON). The processor 70 proceeds through its loop. Preferably, the time for a single pass through the loop is 50 ms.

Figure 11:
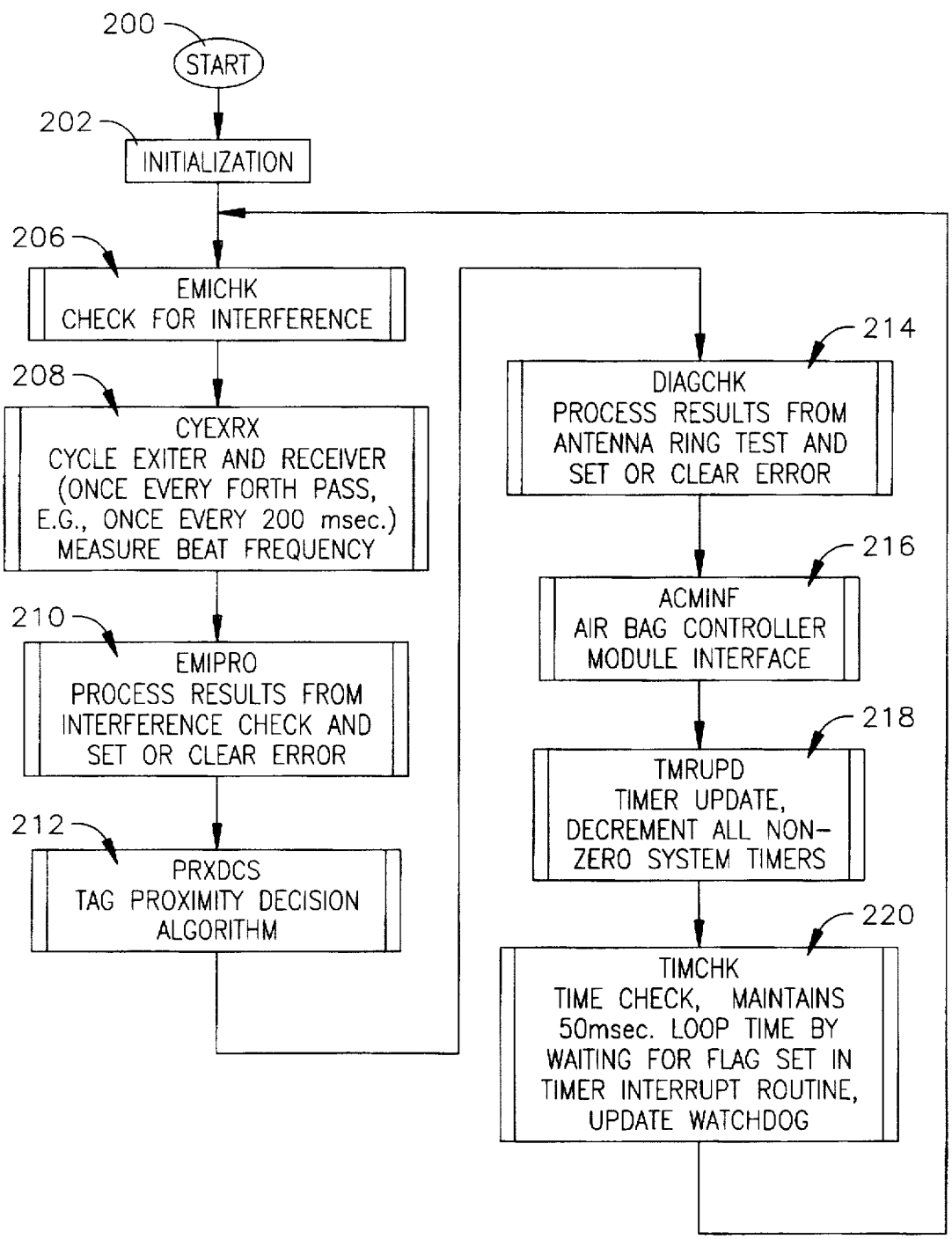

The loop of the process shown in FIG. 11 begins with step 206. At step 206, a subprocess EMICHK (Electromagnetic Interference Check) is performed by the processor 70 to determine whether interference is present. Specifically, during the subprocess EMICHK, the processor 70 performs a portion of the function of the interference determination function 142 (FIG. 2) in which the number of detected pulses in the output signal of the comparator 130 are counted during the second time period. It will be appreciated that the operation of the subprocess EMICHK at step 206 (FIG. 11) occurs prior to the driver/receiver circuit 64 exciting the antenna 60 during this loop through the process. The operation of the subprocess EMICHK occurs subsequent to cessation of the ring-down of the antenna 60 and subsequent to the cessation of the EM return signal 68 from an identification tag 54, if any, which resulted from the preceding pass through the loop.

The processor 70 proceeds to step 208 where a subprocess CYEXRX (Cycle the Exciter and Receiver) is performed. In the subprocess CYEXRX, the processor 70 may cause the driver control 152 to perform one cycle of signal changes. Specifically, the signal from the enable signal generator 156 is changed to cause the gating device 90 to change to the pass state and the signal from the frequency change signal generator 154 is changed to cause the frequency divider 84 to provide its output signal at the first frequency (i.e., the first time period begins). The subprocess CYEXRX awaits the end of the first time period and then again changes the signals from the enable signal generator 156 and the frequency change signal generator 154.

Also, within the subprocess CYEXRX the processor 70 may perform the portion of the ring-down determination 146 in which the number of detected pulses in the output signal of the comparator 130 are counted during the portion of the second time period when antenna ring-down should occur and the portion of the detection decider 144 in which the number of detected pulses are counted during the portion of the second time period after antenna ring-down has occurred. Because the processor 70 proceeds through the loop relatively fast and because a certain amount of non-transmit and non-receive time is needed to perform the interference test, the excitation of the antenna 60, and the determinations regarding antenna ring-down and the presence of an identification tag 54 are performed relatively infrequently. In the preferred embodiment, the cycle of signal changes, and the determinations regarding antenna ring-down and tag presence are performed in the subprocess CYEXRX only once very fourth pass through the process loop shown in FIG. 11. However, if interference has been detected by the subprocess EMICHK, then the cycle of signal changes, and the determinations regarding antenna ring-down and tag presence are not performed.

The processor 70 proceeds to step 210 where a subprocess EMIPRO is performed. The subprocess EMIPRO processes the results of the pulse counting performed by the subprocess EMICHK at step 206 and sets or clears an error indicating signal which is provided to the controller 22 and to other subprocesses in the processor 70. Thus, the subprocess EMIPRO performs a portion of the interference determination function 142 which provides the indicating signal.

The processor 70 proceeds to step 212 where a subprocess PRXDCS (Proximity Decision for Tag) is performed. The subprocess PRXDCS performs a portion of the detection decider function 144 which processes certain results from the subprocess CYEXRX regarding the determination as to whether an identification tag 54 is present. The subprocess PRXDCS also provides a signal indicative of the presence of the identification tag to the controller 22 and to other subprocesses in the processor 70.

The processor 70 proceeds to step 214 where a subprocess DIAGCHK (Diagnostic Check) is performed. Within the subprocess DIAGCHK, the processor 70 processes certain results of the subprocess CYEXRX and determines whether antenna ring-down occurred. Also, the subprocess DIAGCHK provides the signal indicating whether the antenna 60 is functioning properly. The subprocess DIAGCHK also receives the signal from the subprocess PRXDCS indicative of the presence of the identification tag 54. If the signal from the subprocess PRXDCS indicates that an identification tag is present, the subprocess DIAGCHK discounts a nonoccurrence of antenna ring-down and does not provide the signal indicating an absence of antenna ring-down.

The processor 70 proceeds to step 216 where a subprocess ACMINF (Air Bag Control Module Interface) is performed. The subprocess ACMINF controls the various signals which are provided to the controller 22. Each pass through the loop of the process performed by the processor 70 ends upon completion of steps 218 and 220 which are, in a sense, housekeeping steps. Specifically, in step 218, a subprocess TMRUPD is performed in which timers utilized within other subprocesses are updated. In the step 220, a subprocess TIMCHK (Timer Check) is performed in which a timer loop timing sequence is maintained. In a preferred embodiment, the timer loop is a 50 ms duration. Other functions performed within the subprocess TIMCHK include waiting for flags and updating appropriate watchdog signals. Upon completion of the step 220, the processor 70 loops back to step 206 and the process repeats. It is to be understood that other subprocesses can be included in the process shown in FIG. 11 and that additional subprocess may be performed within the process. The following are detailed descriptions of examples of some of the subprocesses of the process shown in FIG. 11.

Figure 12:
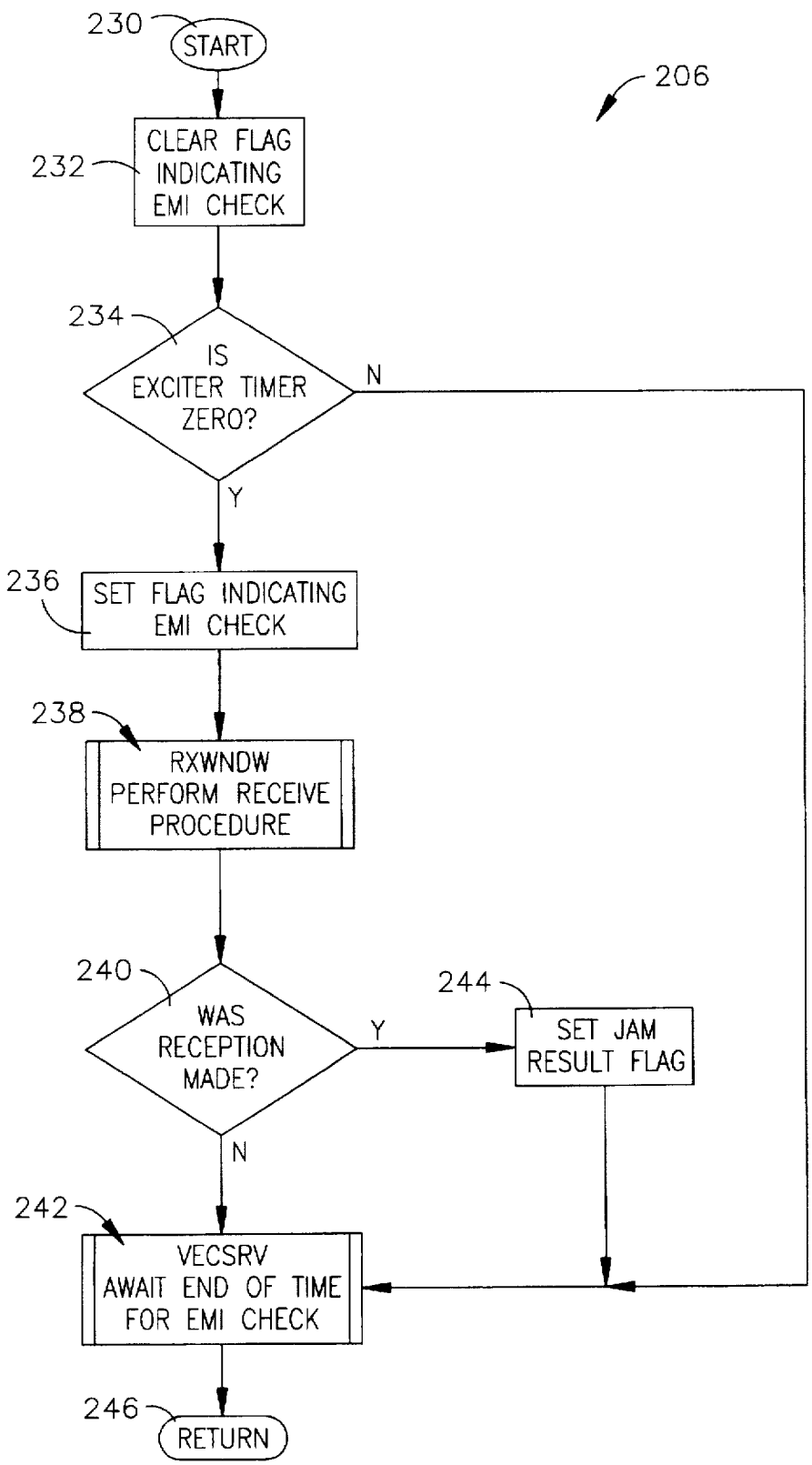

An example of the steps performed within the sub routine EMICHK at step 206 (FIG. 11) is shown in FIG. 12. In this example, the subprocess EMICHK is initiated at a step 230 and proceeds to step 232. At step 232, a flag which indicates that a test for interference has occurred is cleared. At step 234, it is determined whether the exciter timer used within the subprocess CYEXRX (step 208, FIG. 11) has been decremented down to zero. Upon an affirmative determination at step 234 the processor 70 proceeds to step 236. At step 236, the flag indicating that a test for interference has occurred is set and the processor 70 proceeds to step 238.

Within step 238, a subprocess RXWNDW (Receive Window) is performed. The subprocess RXWNDW has the function of receiving the information within the output signal from the comparator 130 and determining whether the output signal is pulsing in a manner resembling that which would occur because of a presence of an identification tag responding to an EM transmit signal. Specifically, the subprocess RXWNDW determines whether the pulsing output signal has the predetermined frequency for the predetermined time duration.

The processor 70 proceeds from step 238 to step 240 where it is determined whether interference was detected, i.e., was the output signal from the comparator 130 pulsing as if an identification tag were present and responding to an EM transmit signal, despite the facts that an identification tag may not be present and an EM transmit signal has not recently occurred. If the determination within step 240 is negative (i.e., no interference), the processor 70 proceeds to step 242. If the determination within step 240 is affirmative (i.e., interference present), the processor 70 proceeds to step 244 in which a jam result flag is set before proceeding to step 242. Upon the negative determination at step 234, the processor 70 jumps directly to step 242.

Within step 242, a subprocess VECSRV (FIG. 16) is performed. The subprocess VECSRV (Vector Service) has several functions. The function provided by the subprocess VECSRV within the subprocess EMICHK (FIG. 12) is that of a service output compare interrupt. The function of the service compare interrupt is to decrement time remaining which is set for performing the interference check. Upon expiration of the time, the subprocess VECSRV ends and the process controller 70 proceeds from step 242 (FIG. 12) to step 246 which is the end of the subprocess EMICHK within the step 206. The process would then return to the main control process. The subprocess VECSRV is described more fully below.

Figure 13:
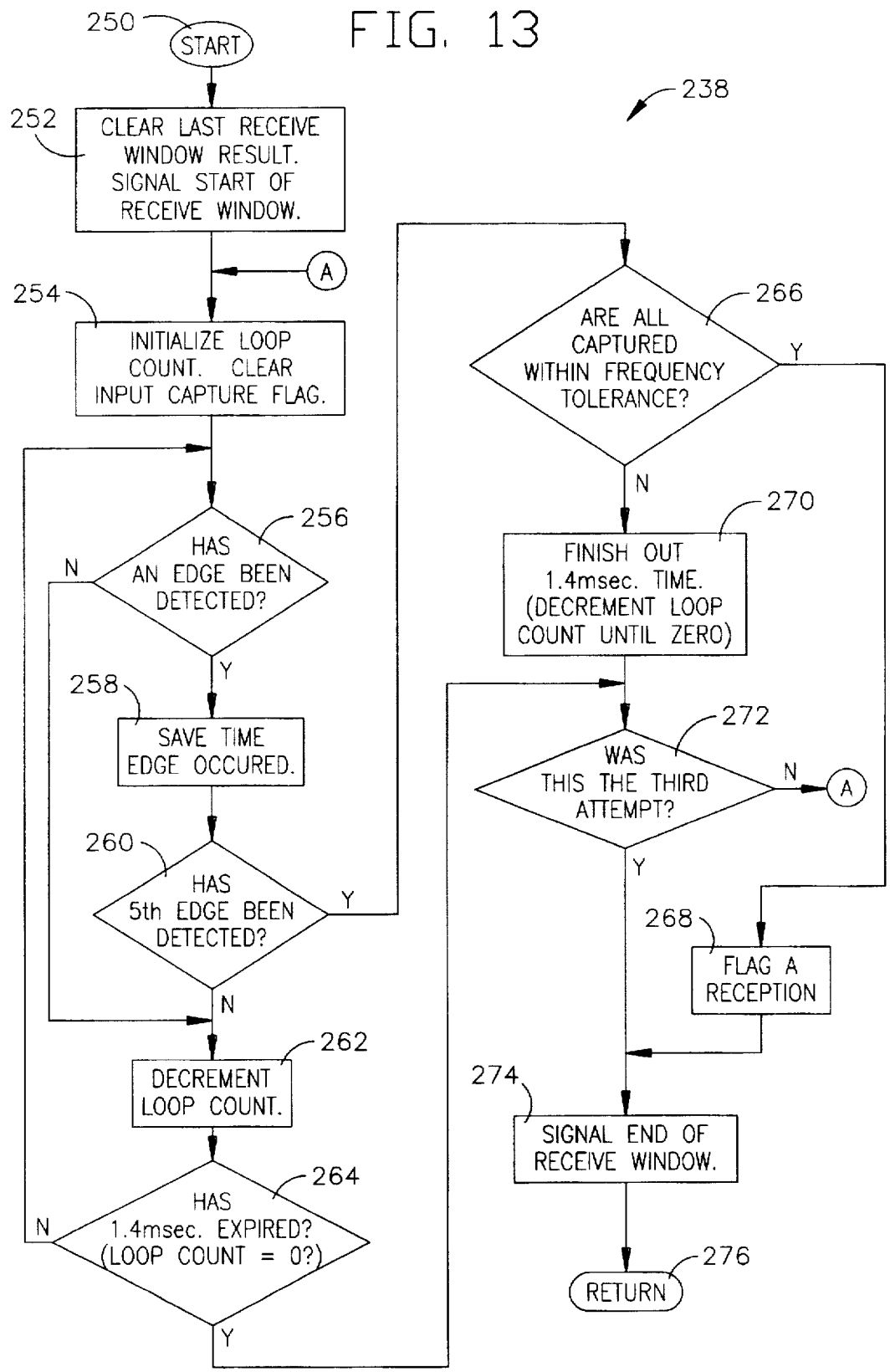

An example of the steps performed within the subprocess RXWNDW at step 238 (FIG. 12) is shown in FIG. 13. Within the subprocess RXWNDW, the processor 70 starts at step 250 and proceeds to step 252. At step 252, the results of the previous operation, if any, of the subprocess RXWNDW are cleared and a signal to begin the present operation of the subprocess is provided. At step 254, a loop count is initialed and an input capture flag is cleared. In the preferred embodiment, the loop count is set to provide for a loop which lasts for 1.4 ms. At step 256, it is determined whether a pulse is detected in the output signal from the comparator 130. In this example, pulses in the output signal from the comparator 130 are detected by detecting a rising (or falling) pulse edge.

If the determination at step 256 is affirmative, the processor 70 proceeds to step 258 where the time of occurrence of the edge is saved in a buffer memory. At step 260, it is determined whether the detected edge is the fifth successive detective edge. From either a negative determination at step 260 or a negative determination in 256, the processor 70 proceeds to step 262, where the loop count to decremented.

From step 262, the processor 70 proceeds to step 264 where it is determined whether the allotted time period (e.g. 1.4 ms) to "look" for the detected pulses (by looking for the respective edges), has expired. If the determination within step 264 is negative, the processor 70 loops back to step 256 to again "look" for a subsequent pulse.

If, within the allotted time period, the processor 70 has detected five successive pulses, the determination in step 260 will be affirmative and the processor 70 proceeds to step 266. At step 266, it is determined whether the pulsing signal represented by the detected pulses is within the predetermined frequency range. In the preferred embodiment, the frequency range is centered on 4.5 kHz. If the determination at step 266 is affirmative, the processor 70 proceeds to step 268 where a flag is set indicating reception of an appropriate pulsing signal from the comparator 130. If the determination within 266 is negative, the processor 70 proceeds to step 270 in which the allotted time period is decremented to zero. At the end of the allotted time period (i.e., upon completion of step 270 or upon an affirmative determination within step 264), the processor 70 proceeds to step 272.

In the preferred embodiment, the processor 70 makes three sequential attempts to determine whether the output signal from the comparator 130 has a pulsing output signal which has the requisite frequency existing for the requisite time period. Thus, at step 272, it is determined whether the most recent attempt to detect the requisite pulsing output signal from the comparator 130 is the third attempt. If the determination within step 272 is negative, the processor 70 loops back to step 254 for another attempt to detect the requisite pulsing output signal.

If the requisite pulsing output signal is detected, i.e., the determination at step 266 was affirmative and the flag was set in step 268, or after three failed attempts, i.e., the determination within step 272 is affirmative, the processor 70 proceeds to step 274 in which the end of the receive attempt is signaled. The processor 70 proceeds to step 276 which ends the subprocess RXWNDW. The process then returns to the main process shown in FIG. 11.

An example of the subprocess CYEXRX performed within the process (FIG. 11) at step 208 is shown in FIG. 14. The subprocess CYEXRX is initiated at step 280 and proceeds to step 282. At step 282, a read indicating flag is cleared. The processor 70 proceeds to step 284 where it is determined whether interference was detected within the subprocess EMICHK (step 206, FIG. 11). Specifically, it is determined whether the jam result flag was set (see step 244, FIG. 12). If interference was detected, the processor 70 cannot reliably make a determination as to whether an identification tag 54 is present. Accordingly, if the determination at step 284 is affirmative (i.e., interference is present), then the processor 70 proceeds to step 286 to end the subprocess CYEXRX.

However, if interference is not present, (i.e., the determination at step 284 is negative), the processor 70 proceeds to step 288. At step 288, it is determined whether the exciter timer is zero (i.e., the first time period has ended and the EM transmit signal has ended). During normal operation of the processor 70, the determination at step 288 will be affirmative, and the processor will proceed to step 292. At step 292, the read indicating flag is set and the processor 70 proceeds to step 294 where a tag indication flag is cleared. At step 296, the exciter timer is re-initialized. At step 298, the enable signal generator 156 provides the signal to cause the gating device 90 to change to the pass state and the frequency change signal generator 154 provides the signal to cause the frequency divider 84 to provide its output signal at the first frequency. At step 300, the processor 70 delays for 2 ms, (i.e., the first time period, also referred to as the transmission time period). At step 302, the signals from the enable signal generator 156 and the frequency change signal generator 154 are changed, thus ending the first time period and beginning the second time period.

The processor 70 proceeds to step 304 in which a subprocess RNGTST (Ring Test) is performed. The subprocess RNGTST functions to receive information regarding whether the output signal from the comparator 130 has the pulses indicating the ring-down of the antenna 60.

The processor 70 proceeds from step 304 to step 238, which again is the subprocess RXWNDW which was performed in the subprocess EMICHK (FIG. 12). The same subprocess RXWNDW (FIG. 13) is utilized because the presence of the identification tag 54 and the presence of interference both cause a pulsing output signal from of the comparator 130.

The processor 70 proceeds from step 238 to step 310. At step 310, it is determined whether a detection of the identification tag 54 was made. If the determination within step 310 is affirmative, a tag indication signal is set at step 312 and the processor 70 proceeds to step 314 to end the subprocess CYEXRX. If the determination within step 310 is negative, the processor 70 skips to step 314.

An example of the subprocess RNGTST performed within step 304 (FIG. 14) is shown in FIG. 15. The subprocess RNGTST begins at step 320 and proceeds to step 322. At step 322, a timer is initiated. In the preferred embodiment, the timer is a 1.2 millisecond timer. The 1.2 millisecond duration typically corresponds to the length of the ring-down of the antenna 60 at the end of the first time period. From step 322, the processor 70 proceeds to step 242 which is the subprocess VECSRV. The subprocess VECSRV, at this point, is used in an input capture interrupt mode. The input capture interrupt mode counts pulses in the output signal of the comparator 130. The count is used to determine whether the antenna 60 is ringing-down and thus functioning properly. At the end of the subprocess VECSRV in the input capture interrupt mode, the processor 70 proceeds to step 242 which is, again, the subprocess VECSRV. At this point, the subprocess VECSRV is used in the service output compare interrupt function. Within the subprocess VECSRV, at this point, a ring test completion flag is set. The processor 70 proceeds from step 242 (i.e., the subprocess VECSRV) to step 326. At step 326, it is determined whether the timer is zero. If the determination within step 326 is negative (i.e., the timer is not zero), then the processor 70 loops back to again enter the subprocess VECSRV in the input capture interrupt mode. If the determination at step 326 is affirmative, i.e. the time has expired, the processor 70 proceeds to step 328 to end the subprocess RNGTST.

Figure 16:
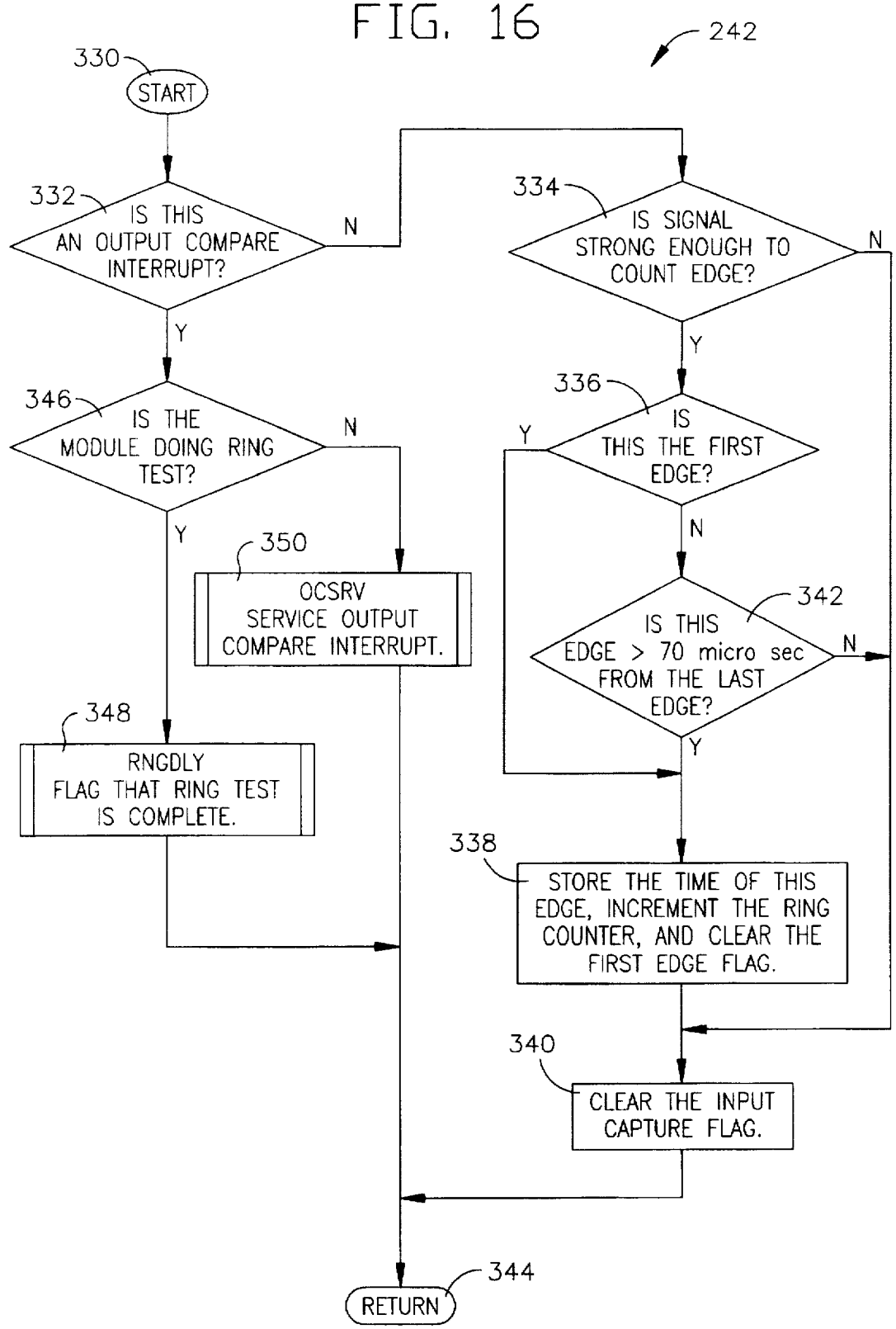

An example of the subprocess VECSRV within step 242 (FIGS. 12 and 15) is shown in FIG. 16. The subprocess VECSRV is initiated at step 330 and proceeds to step 332. At step 332, it is determined whether the subprocess VECSRV is performing the function of an output compare interrupt, i.e., whether the subprocess VECSRV is being used to run out a time period for another subprocess. If the determination within step 332 is negative, then the subprocess VECSRV is being used to perform an input capture interrupt function, i.e. to count the number of pulses during the ring test.

When the determination within step 332 is negative, the processor 70 proceeds to step 334. At step 334, it is determined whether the pulse signal has sufficient strength (e.g., the pulse has at least a predetermined amplitude). If the determination at step 334 is affirmative, the processor 70 proceeds to step 336 where it is queried whether the detected pulse edge is the first pulse (i.e., first pulse edge). If the determination within step 336 is affirmative, the processor 70 proceeds to step 338 in which the time of the pulse edge is stored within the buffer memory, a ring counter is incremented and a first edge flag is cleared. The processor 70 proceeds to step 340 and the input capture flag is cleared.

After the first pulse, the processor 70 can begin to make determinations regarding frequency. Specifically, the processor 70 determines if the period of the pulses is within a certain range (e.g., a period of less than 70 microseconds). Accordingly, after the first pulse, subsequent passes through the subprocess VECSRV in an input capture function result in the processor 70 proceeding from step 336 to step 342. At step 342, it is determined whether a pulse occurred within the certain period after a previous pulse (i.e., frequency measurement).

It should be appreciated that if the signal has insufficient strength, i.e., the determination within step 334 is negative, or that the pulsing output signal has a frequency outside of the permitted range of frequency, i.e., the determination within step 342 is negative, a normal ring-down of the antenna 60 is not occurring and, thus, the storage of pulse edges and incrementation of the ring counter does not occur. Specifically, a negative determination within step 334 or 342 results in the processor 70 skipping to step 340. At the end of the subprocess VECSRV, the processor 70 goes to step 344 and returns to the location at which the subprocess VECSRV was called.

If the subprocess VECSRV (FIG. 16) is called to perform the input capture interrupt from the subprocess RNGTST (FIG. 15), the subprocess VECSRV will be repeatedly called until the timer running in the subprocess RNGTST expires. Each time the subprocess VECSRV is called from the subprocess RNGTST to perform the input capture interrupt, the determination at step 332 will be negative.

The determination within step 332 is affirmative when the subprocess VECSRV is not being called as an input capture interrupt, but instead is called to perform the function as an output compare interrupt. Upon the affirmative determination at step 332, the processor 70 proceeds to step 346. At step 346, it is determined whether the subprocess VECSRV was called by the subprocess RNGTST, i.e., is the module doing the ring test. If the determination at step 346 is affirmative, the processor 70 proceeds to step 348 in which a subprocess RNGDLY is performed to flag that the ring test is complete. At the end of the step 348, the processor 70 proceeds to step 344 to end the subprocess VECSRV.

However, if the subprocess VECSRV was called to perform an output compare interrupt by a subprocess other than RNGTST (i.e., the subprocess VECSRV was called by EMICHK), then the determination at step 346 is negative. Upon the negative determination at step 346, the processor 70 proceeds to step 350 in which a subprocess OCSRV is performed. The subprocess OCSRV is a service routine in which the appropriate timers are expired and timer expiration flags are set. At the end of the subprocess OCSRV in step 350, the processor 70 proceeds to step 344 and returns to the point at which the subprocess VECSRV was called.

An example of the subprocess EMIPRO (step 210 FIG. 11) is shown in FIG. 17. The subprocess EMIPRO is initiated at step 360 and proceeds to step 362. At step 362, it is determined whether the subprocess EMICHK at step 206 (FIG. 11) was performed (i.e., whether an interference test was performed). If the determination at step 362 is affirmative, the processor 70 proceeds to step 364. At step 364, it is determined whether interference was detected. If the determination at step 364 is affirmative, the processor 70 proceeds to step 366 where the jam error flag is set and an EMI fault timer is initialized. In the preferred embodiment, the period of the timer is 5 seconds. The EMI fault timer is used by the processor 70 in other subprocess to indicate that interference has been recently detected (e.g., not more than 5 seconds ago). If interference has been recently detected, the processor 70 will not perform certain functions because the interference may cause unreliable results. For example, if a determination of whether an identification tag is present is not performed, the result may not be reliable.

The EMI fault timer (initialized in step 366, FIG. 17) provides a time in which interference must be non-existent before the processor 70 resumes making determinations as to whether the identification tag 54 is present.

Upon completion of the step 366, the processor 70 proceeds to a return step 368 and the process shown in FIG. 11 continues. However, within the subprocess EMIPRO (FIG. 17), if the determination at step 362 was negative, then the processor 70 would immediately jump to the return step 368 because an EMI check was not run.

Consider now the condition that interference has been recently detected (i.e., the jam error flag is set, and the EMI fault timer is running and not yet zero), but the current determination is that interference is not present. As the processor 70 proceeds through the subprocess EMIPRO, the determination at step 362 is affirmative and the determination at step 364 is negative. The processor 70 proceeds to step 370, in which it is determined whether the EMI fault timer is zero. The determination at step 370 is negative, because the time period had not yet expired. The processor 70 proceeds to return step 368.

If, on the other hand, the processor 70 arrives at step 370 and the EMI fault timer is zero, then the processor 70 goes to step 372 to clear the jam error flag prior to proceeding to the return step 368. The processor 70 can arrive at the step 370 with the EMI fault timer at zero when the last detection of interference was longer than the EMI timer period ago, or interference was never detected.

An example of the subprocess DIAGCHK at step 214 (FIG. 11) is illustrated in FIG. 18. The subprocess DIAGCHK is initiated at step 380 and proceeds to step 382. At step 382, it is determined whether the processor 70 proceeded through subprocess CYEXRX (FIG. 14) i.e., the subprocess CYEXRX was not exited at step 286 or 290, but rather exited only at the concluding return step 314. If the determination at step 382 is affirmative (i.e., a "read" was taken), then the processor 70 proceeds to step 384. At step 384 it is determined whether an identification tag was detected. If the determination at step 384 is negative, then the processor 70 proceeds to step 386.

If an identification tag is not present, then it must be queried whether the antenna 60 is functioning properly. To make this inquiry, the results derived from the subprocess RNGTST (FIG. 15) within the subprocess CYEXRX (FIG. 14) are analyzed. At step 386, it is determined whether the number of detected pulses during the ring-down test is less than a predetermined number. In the preferred embodiment, the predetermined number is four.

If the number of pulses counted during the ring-down test is less than the predetermined number (e.g., zero-three), then the antenna 60 is not functioning properly because the normally expected ring-down did not occur. Upon an affirmative determination in step 386, the processor 70 proceeds to step 388 where it is determined whether a ring fault flag is set. If this is the first pass through the subprocess DIAGCHK in which step 386 determined that the antenna 60 did not properly ring-down, then the ring fault flag would not have been previously set. Thus, the determination at step 388 would be negative during such a first pass. Upon a negative determination at step 388, the processor 70 proceeds to step 390 in which a fault counter is incremented (beginning at zero and stepping upward).

The processor 70 repeatedly tests for antenna ring-down. The absence of antenna ring-down during immediately successive tests will cause the fault count to be incremented. The processor 70 proceeds to step 392 where it is determined whether the fault count is less than a predetermined number. In other words, the processor 70 determines whether the number of successive tests for antenna ring-down indicating ring-down was absent is less than the predetermined number of attempts. In the preferred embodiment, the number is three. If the determination at step 392 is negative (i.e, three attempts have not yet been made), then the processor 70 proceeds to step 394.

At step 394, the processor 70 determines whether an identification tag 54 has been detected. Typically, if the antenna 60 fails to ring-down, the antenna will not be functioning properly such that an identification tag can not be detected. As a result, the determination at step 394 is negative, and the processor 70 proceeds to step 396. At step 396, it is determined whether the ring fault flag is set. If this is the first pass through the subprocess DIAGCHK by the processor 70, the ring fault flag would not have been set and the determination at step 396 would be negative. Upon the negative determination at step 396, the processor 70 proceeds to step 398 where a ring error flag is cleared (or maintained clear). The processor 70 proceeds from the step 398 to a return step 400. It should be appreciated that the settings of the ring error flag, the ring fault flag, and the fault counter remain set as the processor 70 proceeds through all subsequent steps within the process shown in FIG. 11.

For each subsequent pass through the process shown in FIG. 11, the processor 70 will again proceed through the subprocess DIAGCHK (FIG. 18), beginning at step 380. If the ring test performed by the processor 70 continues to show that the antenna 60 is not functioning properly (i.e., the antenna does not ring-down) then, the fault counter will continue to be incremented at step 390. When three successive passes are made with the ring test indicating absence of ring-down each time, the determination at step 392 will be affirmative. The processor 70 will proceed from step 392 to a step 402. At step 402, the fault timer is initialized. In the preferred embodiment, the period of the timer is five seconds. The fault timer is used by the processor 70 to indicate that the antenna 60 has recently failed to ring-down (e.g., not more than five seconds ago). If ring-down of the antenna has not recently occurred, other determinations made by the processor 70 become suspect. For example, the determination of whether an identification tag is present may not be correct. The fault timer provides a time in which ring-down of the antenna must occur before the processor 70 can reasonably resume to make determinations as to whether the identification tag 54 is present without the determination being suspect. This is, in effect, a reset condition on the error detection.

From the step 402, the processor proceeds to step 394. Typically, if the antenna 60 fails to exhibit ring-down, the antenna is not functioning properly such that tag identification can not be detected. As a result, if the determination at step 394 is negative, then the processor proceeds to step 396. At step 396, it is determined whether the ring fault flag is set. If the ring fault flag is set in step 402, the determination at step 396 would be affirmative and the processor proceeds to step 404. At step 404, a ring error flag is set before the processor proceeds to return step 400.

If the ring-down of the antenna 60 occurred during the loop through the process (FIG. 11), then, when the processor 70 proceeds through the subprocess DIAGCHK, the determination at step 386 will be negative. Accordingly, the processor 70 will proceed from step 386 to step 406. At step 406, the fault counter is cleared or maintained clear. The processor proceeds from step 406 to step 408 where it is determined whether the fault timer is zero. If the determination in step 408 is negative, then the processor 70 proceeds to step 394. At step 394, the processor again determines whether an identification tag is present and will proceed to either step 396 or 398 dependent upon that determination.

If, on the other hand, the fault timer is zero, the processor 70 proceeds from step 408 to step 410. At step 410, the ring fault flag is cleared or maintained clear. The processor 70 then proceeds to step 394. If the determination at step 394 is negative, then the processor proceeds to step 396. Following this process path, the determination at step 396 will be negative because the ring fault flag was cleared in step 410. Upon the negative determination at step 396, the processor proceeds to step 398 to clear the ring error flag.

The above-described process provides an error detecting capability with a rearward facing child restraint system. The error detecting process detects EM interference and monitors antenna performance.

From the above description of the invention, those skilled in the art will perceive improvements, changes and modifications. Such improvements, changes and modifications within the skill of the art are intended to be covered by the appended claims.

Having described the invention, the following is claimed:

1. A method for sensing the presence of an object, said method comprising:

securing identifier means to the object;

transmitting an electromagnetic signal during a transmission time period;

providing an electromagnetic return signal in response to the transmitted electromagnetic signal;

receiving electromagnetic signals, and providing an output containing information;

receiving the output;

determining whether the identifier means is present by processing information contained within the received output;

providing a signal indicative of the determination of whether the identifier means is present;

determining whether the received output contains unreliable information, including determining whether an electromagnetic return signal indicating the presence of the identifier means is received prior to the transmission time period; and providing an error signal indicative of the unreliability of the received output when it is determined that the received output is unreliable.

2. A method for sensing the presence of an object, said method comprising:

provid securing identifier means to the object;

transmitting an electromagnetic signal during a transmission time period;

providing an electromagnetic return signal in response to the transmitted electromagnetic signal;

providing a receiver means which includes an antenna means;

receiving electromagnetic signals at the antenna means of the receiver means;

providing an output from the receiver means containing information;

receiving the output from the receiver means;

determining whether the identifier means is present by processing information contained within the output of the receiver means;

providing a signal indicative of the determination of whether the identifier means is present;

determining whether the output of the receiver means contains unreliable information, including determining whether the antenna means is not functioning properly utilizing the output from the receiver means outside of the transmission time period; and providing an error signal indicative of the unreliability of the output of the receiver means when it is determined that the output of the receiver means is unreliable.

3. An apparatus for sensing the presence of an object, said apparatus comprising:

transmitter means for providing a transmitted electromagnetic signal existing during a transmission time period;

identifier means securable to the object for providing an electromagnetic return signal in response to said transmitted electromagnetic signal, said electromagnetic return signal existing beyond said transmission time period;

receiver means for receiving electromagnetic signals, said receiver means including output means for providing an output containing information;

determination means processing information contained within said output of said receiver means for determining whether said identifier means is present in response to said output of said receiver means and providing a signal indicative thereof; and error detection means for determining whether said output of said receiver means contains unreliable information and providing a signal indicative thereof, said error detection means including means for processing said output of said receiver means outside of said transmission time period, said error detection means including means for determining whether said receiver means is receiving an electromagnetic return signal indicating the presence of an identifier means prior to said transmission time period, said signal provided by said error detection means indicating that said receiver means is receiving an electromagnetic return signal falsely indicating the presence of an identification means when said means for determining determines that said receiver means is receiving an electromagnetic return signal indicating the presence of an identifier means prior to said transmission time period.

4. A method for sensing the presence of an object, said method comprising:

securing identifier means to the object;

providing antenna means;

transmitting an electromagnetic signal during a transmission time period, including exciting the antenna means to emit the transmitted electromagnetic signal;

providing an electromagnetic return signal from the identifier means in response to the transmitted electromagnetic signal, the electromagnetic return signal existing beyond the transmission time period;

receiving electromagnetic signals, and providing an output containing information;

receiving the output;

determining whether the identifier means is present by processing information contained within the output;

providing a signal indicative of the determination of whether the identifier means is present;

determining whether the received output contains unreliable information, including processing the received output outside of the transmission time period, including determining whether the antenna means is not functioning properly; and providing an error signal indicative of the unreliability of the received output when it is determined that the received output is unreliable.

5. A method for sensing the presence of an object, said method comprising:

securing identifier means to the object;

transmitting an electromagnetic signal during a transmission time period;

providing an electromagnetic return signal from the identifier means in response to the transmitted electromagnetic signal, the electromagnetic return signal existing beyond the transmission time period;

receiving electromagnetic signals, and providing an output containing information;

receiving the output;

determining whether the identifier means is present by processing information contained within the output;

providing a signal indicative of the determination of whether the identifier means is present;

determining whether the received output contains unreliable information, including processing the received output outside of the transmission time period;

providing an error signal indicative of the unreliability of the received output when it is determined that the received output is unreliable;

providing a single antenna for transmitting the transmitted electromagnetic signal and for receiving the received electromagnetic signals;

exciting the antenna during the transmission time period, and continuing the antenna in an excited state and providing an excitation indicating signal immediately after the transmission time period when the antenna is functioning properly; and said step of determining whether the output contains unreliable information including determining whether the antenna fails to provide the excitation indicating signal following the transmission time period.

6. An apparatus for sensing the presence of an object, said apparatus comprising:

transmitter means for providing a transmitted electromagnetic signal existing during a transmission time period;

identifier means securable to the object for providing an electromagnetic return signal in response to said transmitted electromagnetic signal, said electromagnetic return signal existing beyond said transmission time period;

receiver means for receiving electromagnetic signals, said receiver means including output means for providing an output containing information;

determination means processing information contained within said output of said receiver means for determining whether said identifier means is present in response to said output of said receiver means and providing a signal indicative thereof; and error detection means for determining whether said output of said receiver means contains unreliable information and providing a signal indicative thereof, said error detection means including means for processing said output of said receiver means outside of said transmission time period.

7. An apparatus as set forth in claim 6, wherein said receiver means includes antenna means for providing an electrical signal responsive to said received electromagnetic signals, said error detection means includes means for determining whether said antenna means is not functioning properly.

8. An apparatus as set forth in claim 6, wherein said transmitter means and said receiver means include a single antenna for transmitting said transmitted electromagnetic signal and for receiving said received electromagnetic signals, said transmitter means includes means for exciting said antenna during said transmission time period, said antenna includes means for continuing in an excited state and providing an excitation indicating signal immediately after said transmission time period when said antenna is functioning properly, and wherein said error detection means includes means for determining whether said antenna fails to provide said excitation indicating signal following said transmission time period.

9. An apparatus as set forth in claim 6 further including means to secure said identifier means to a child restraining seat.

10. An apparatus as set forth in claim 6 further includes means for disabling an actuatable restraining device in a vehicle when said identifier means is determined to be present.

11. An apparatus for sensing the presence of an object, said apparatus comprising:

transmitter means for providing a transmitted electromagnetic signal existing during a transmission time period;

identifier means securable to the object for providing an electromagnetic return signal in response to said transmitted electromagnetic signal;

receiver means for receiving electromagnetic signals, said receiver means including output means for providing an output containing information;

determination means processing information contained within said output of said receiver means for determining whether said identifier means is present in response to said output of said receiver means and providing a signal indicative thereof; and error detection means for determining whether said output of said receiver means contains unreliable information and providing a signal indicative thereof, said error detection means includes means for determining whether said receiver means is improperly receiving an electromagnetic return signal indicating the presence of said identifier means prior to said transmission time period.

12. An apparatus as set forth in claim 11 further including means to secure said identifier means to a child restraining seat.

13. An apparatus as set forth in claim 11 further includes means for disabling an actuatable restraining device in a vehicle when said identifier means is determined to be present.

14. An apparatus for sensing the presence of an object, said apparatus comprising:

transmitter means for providing a transmitted electromagnetic signal existing during a transmission time period;

identifier means securable to the object for providing an electromagnetic return signal in response to said transmitted electromagnetic signal;

receiver means for receiving electromagnetic signals, said receiver means including antenna means for receiving said received electromagnetic signals and providing a signal responsive to said received electromagnetic signals, said receiver means further including output means for providing an output containing information derived from said signal from said antenna means;

determination means processing information contained within said output of said receiver means for determining whether said identifier means is present in response to said output of said receiver means and providing a signal indicative thereof; and error detection means for determining whether said output of said receiver means contains unreliable information and providing a signal indicative thereof, said error detection means includes means for determining whether said antenna means is not functioning properly utilizing said output of said receiver means outside of said transmission time period.

15. An apparatus as set forth in claim 14, wherein said antenna means includes a single antenna shared by said transmitter means and said receiver means for transmitting said transmitted electromagnetic signal and for receiving said received electromagnetic signals, said transmitter means includes means for exciting said antenna during said transmission time period, said antenna includes means for continuing in an excited state and providing an excitation indicating signal immediately after said transmission time period when said antenna is functioning properly, said error detection means includes means for determining whether said antenna fails to provide said excitation indicating signal following said transmission time period.

16. An apparatus as set forth in claim 14 further including means to secure said identifier means to a child restraining seat.

17. An apparatus as set forth in claim 14 further includes means for disabling an actuatable restraining device in a vehicle when said identifier means is determined to be present.

18. A method for sensing the presence of an object, said method comprising:

securing identifier means to the object;

transmitting an electromagnetic signal during a transmission time period;

providing an electromagnetic return signal from the identifier means in response to the transmitted electromagnetic signal, the electromagnetic return signal existing beyond the transmission time period;

receiving electromagnetic signals, and providing an output containing information;

receiving the output;

determining whether the identifier means is present by processing information contained within the output;

providing a signal indicative of the determination of whether the identifier means is present;

determining whether the received output contains unreliable information, including processing the received output outside of the transmission time period; and providing an error signal indicative of the unreliability of the received output when it is determined that the received output is unreliable.

19. A method as set forth in claim 18, wherein said step of determining whether the received output contains unreliable information includes determining whether an electromagnetic return signal indicating the presence of an identifier means is received prior to said step of transmitting an electromagnetic signal, said step of providing an error signal includes indicating the receipt of an electromagnetic return signal indicating the presence of an identification means prior to transmission of the transmitted electromagnetic signal.

20. A method as set forth in claim 18, wherein the step of securing includes securing the identifier means to a child restraining seat.

21. An apparatus for sensing the presence of an object, said apparatus comprising:

transmitter means for providing a transmitted electromagnetic signal existing during a transmission time period;

identifier means securable to the object for providing an electromagnetic return signal in response to said transmitted electromagnetic signal, said electromagnetic return signal existing beyond said transmission time period;

receiver means for receiving electromagnetic signals, said receiver means including output means for providing an output containing information;

determination means processing information contained within said output of said receiver means for determining whether said identifier means is present in response to said output of said receiver means and providing a signal indicative thereof;

error detection means for determining whether said output of said receiver means contains unreliable information and providing a signal indicative thereof, said error detection means including means for processing said output of said receiver means outside of said transmission time period;

said transmitter means including signal provider means for providing an electrical signal having a first frequency during said transmission time period and an electrical signal having a second frequency outside of said transmission time period; and said receiver means including means for providing an electrical signal having said first frequency responsive to said electromagnetic return signal.

22. An apparatus as set forth in claim 21 further including a band-pass filter for filtering said electrical signal from said antenna means.

23. An apparatus as set forth in claim 21, including combiner means for mixing signals from said signal provider means and said receiver means.

24. An apparatus as set forth in claim 23, wherein said combiner means provides a beat signal provided when said identifier means is present.

25. An apparatus as set forth in claim 24, wherein said beat frequency is approximately equal to the difference between said first and second frequencies.

26. An apparatus as set forth in claim 24, includes means coupled to receive said beat signal for providing a pulsing signal having a frequency equal to said beat frequency.

\* \* \* \* \*